（12） United States Patent
Kimura et al.

(10) Patent No.: US 8,483,499 B2
(45) Date of Patent: Jul. 9, 2013

(54) IMAGE PROCESSING APPARATUS, IMAGE PROCESSING METHOD, COMPUTER-READABLE MEDIUM AND COMPUTER DATA SIGNAL

(75) Inventors: Shunichi Kimura, Kanagawa (JP); Ikken So, Kanagawa (JP); Masanori Sekino, Kanagawa (JP); Yutaka Koshi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1252 days.

(21) Appl. No.: 12/137,343

(22) Filed: Jun. 11, 2008

(65) Prior Publication Data

US 2009/0097765 A1 Apr. 16, 2009

(30) Foreign Application Priority Data

Oct. 11, 2007 (JP) ................................. 2007-265652

(51) Int. Cl.
*G06K 9/46* (2006.01)
(52) U.S. Cl.
USPC ........... 382/243; 382/162; 382/164; 382/166; 382/173; 382/232; 382/305
(58) Field of Classification Search
None
See application file for complete search history.

(56) References Cited

U.S. PATENT DOCUMENTS

| 2001/0000710 | A1* | 5/2001 | Queiroz et al. ............... 382/264 |
| 2001/0000711 | A1 | 5/2001 | Queiroz et al. |
| 2003/0152270 | A1 | 8/2003 | Saiga et al. |
| 2004/0227758 | A1* | 11/2004 | Curry et al. ................... 345/426 |
| 2005/0180649 | A1 | 8/2005 | Curry et al. |
| 2005/0226517 | A1* | 10/2005 | Kimura et al. ................ 382/243 |
| 2006/0001690 | A1* | 1/2006 | Martinez et al. ................ 347/19 |
| 2007/0230810 | A1* | 10/2007 | Kanatsu ........................ 382/243 |

FOREIGN PATENT DOCUMENTS

| JP | A-5-211605 | 8/1993 |
| JP | A-5-211608 | 8/1993 |
| JP | A-7-203214 | 8/1995 |
| JP | A-2000-196893 | 7/2000 |
| JP | A-2001-268371 | 9/2001 |
| JP | A-2002-165105 | 6/2002 |
| JP | A-2003-87558 | 3/2003 |
| JP | A-2005-228331 | 8/2005 |
| JP | A-2006-253892 | 9/2006 |

OTHER PUBLICATIONS

Japanese Office Action dated Jan. 27, 2011 issued in Japanese Patent Application No. 2007-265652 (with translation).
"Image Engineering" (Toshi Minami, et al.., first edition, published by Corona Publishing Co., Ltd., pp. 96 to 103 (1989)).
Dec. 22, 2009 Office Action issued in Japanese Patent Application No. 2007-265652 (with translation).

* cited by examiner

*Primary Examiner* — Jason M Repko
*Assistant Examiner* — David Perlman
(74) *Attorney, Agent, or Firm* — Oliff & Berridge, PLC

(57) ABSTRACT

An image processing apparatus includes an image extracting unit, a vector information generating unit and a color information adding unit. The image extracting unit extracts an image to be vectorized from a multilevel image as a binary image. The vector information generating unit vectorizes the binary image extracted by the image extracting unit to generate vector information. The color information adding unit adds color information to the vector information generated by the vector information generating unit.

3 Claims, 38 Drawing Sheets

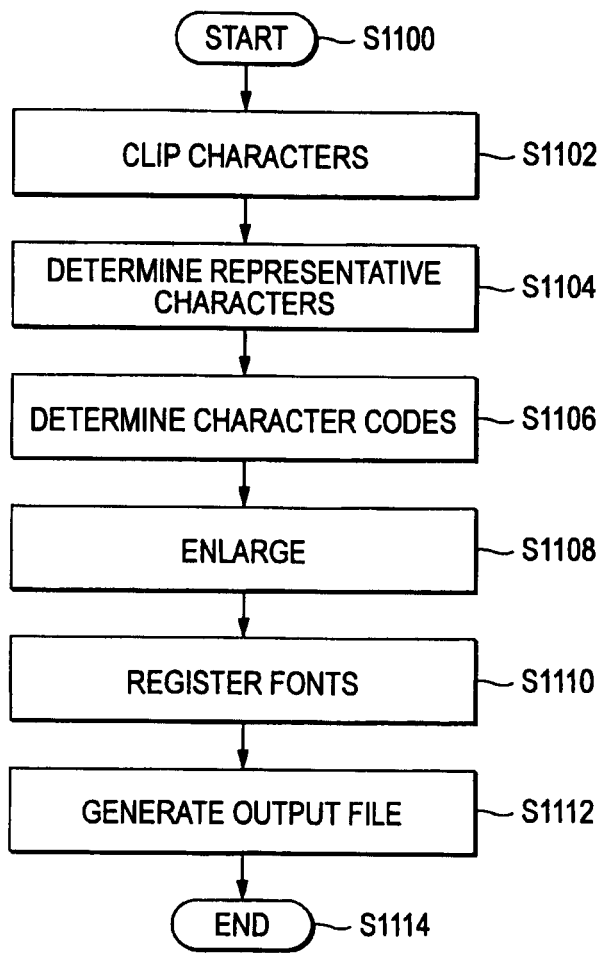

FIG. 28

| CHARACTER CODE | CHARACTER SIZE | CHARACTER POSITION X | CHARACTER POSITION Y | CHARACTER COLOR |
|---|---|---|---|---|
| 1 | | | | |
| 2 | | | | |
| 3 | | | | |
| 4 | | | | |
| 5 | | | | |
| 6 | | | | |
| 7 | | | | |
| 8 | | | | |

2801 — CHARACTER CODE
2802 — CHARACTER SIZE
2803 — CHARACTER POSITION X
2804 — CHARACTER POSITION Y
2805 — CHARACTER COLOR
2800

FIG. 37

| CHARACTER CODE 3701 | CHARACTER SIZE 3702 | CHARACTER POSITION X 3703 | CHARACTER POSITION Y 3704 | CHARACTER COLOR 3705 | WHETHER OR NOT CLIPPING IS PERFORMED 3706 |
|---|---|---|---|---|---|
| 1 | | | | | |
| 2 | | | | | |
| 3 | | | | | |
| 4 | | | | | |
| 5 | | | | | |
| 6 | | | | | |
| 7 | | | | | |
| 8 | | | | | |

3700

IMAGE PROCESSING APPARATUS, IMAGE PROCESSING METHOD, COMPUTER-READABLE MEDIUM AND COMPUTER DATA SIGNAL

CROSS-REFERENCE TO RELATED APPLICATIONS

This application is based on and claims priority under 35 USC 119 from Japanese Patent Application No. 2007-265652 filed Oct. 11, 2007.

BACKGROUND

1. Technical Field

The invention relates to an image processing apparatus, an image processing method, a computer-readable medium and a computer data signal.

2. Related Art

It has been known a technique for converting the whole image data or individual character images in the image data into vector information (including outline information) and for facilitating reuse of the image data. For example, even when an image is enlarged, an image with no image degradation can be obtained by outlining character images. Furthermore, the reuse such as editing is facilitated by the outlining.

SUMMARY

According to an aspect of the invention, an image processing apparatus includes an image extracting unit, a vector information generating unit and a color information adding unit. The image extracting unit extracts an image to be vectorized from a multilevel image as a binary image. The vector information generating unit vectorizes the binary image extracted by the image extracting unit to generate vector information. The color information adding unit adds color information to the vector information generated by the vector information generating unit.

BRIEF DESCRIPTION OF THE DRAWINGS

Exemplary embodiments of the invention will be described in detail below based on the attached drawings, wherein:

FIG. 11 is a flow chart showing an exemplary process according to the exemplary embodiment 1-1-3;

FIG. 28 is an explanatory diagram showing an example of a data structure of a character-layer-data table;

FIG. 37 is an explanatory diagram showing an example of a data structure of a character-layer-data table.

DETAILED DESCRIPTION

Figure 1:
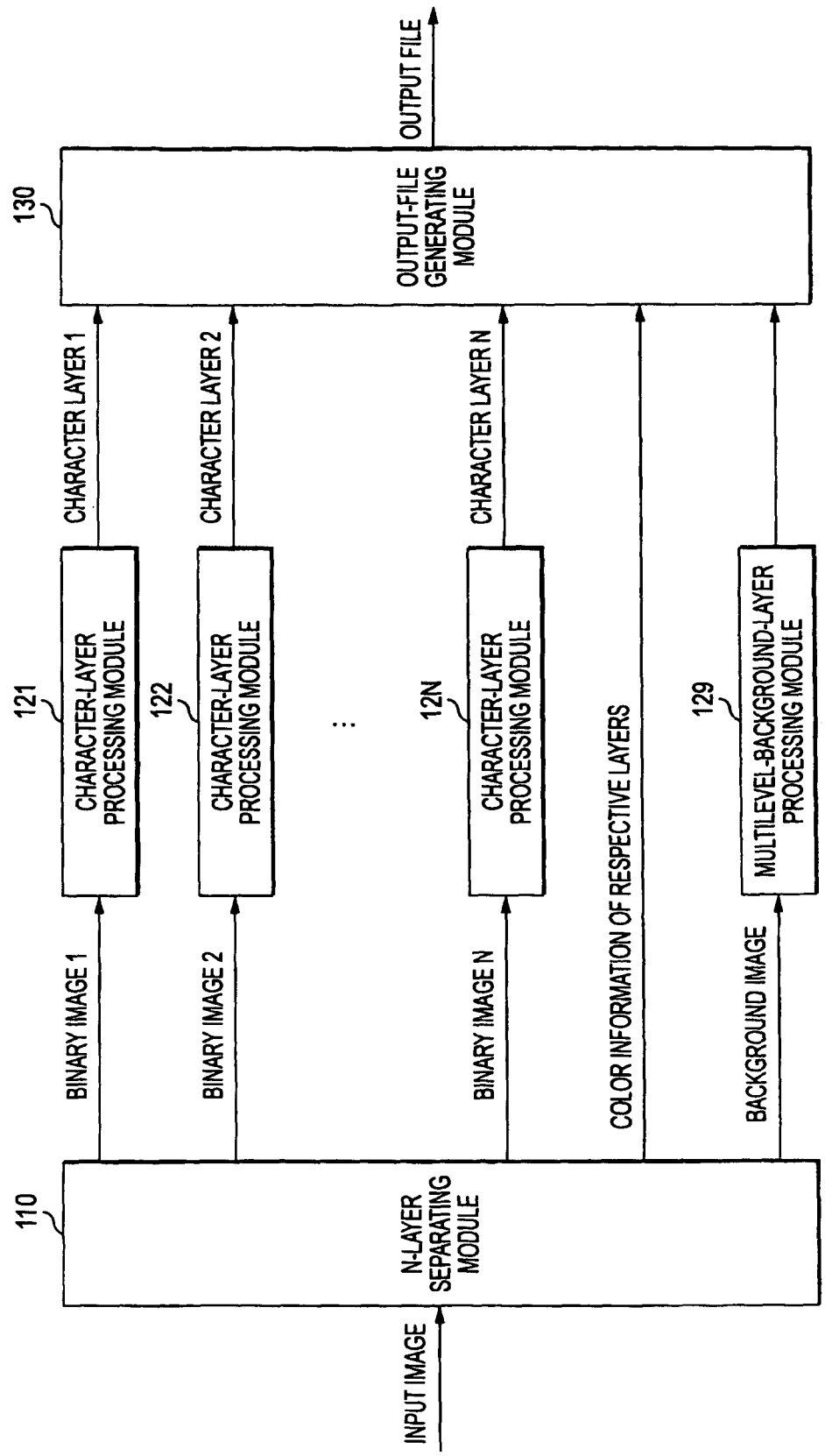
FIG. 1 is a module configuration diagram conceptually showing an exemplary configuration of an exemplary embodiment 1-1.

Hereinafter, examples of exemplary embodiments of the invention will be described with reference to the accompanying drawings.

Modules generally refer to parts, such as software (computer program), hardware and the like, which can be logically separated. Accordingly, modules in the exemplary embodiments include not only computer program modules but also hardware modules. Therefore, the exemplary embodiments include description about computer programs, systems and methods. For the convenience of description, "store" and similar words are used, and these words are intended to mean storing something in a storage device or causing, and these words are intended to mean storing something in a storage device or causing a storage device to store something therein if the exemplary embodiments are implemented by a computer program. Also, although modules have a one-to-one correspondence relation with their functions, for implementation, one module may be configured by one computer program, plural modules may be configured by one program, or one module may be configured by plural programs. Also, plural modules may be executed by one computer, or one module may be executed by plural computers in distributed or parallel environments. Also, different modules may be included in one module. Hereinafter, "connection" includes physical connection, logical connection (data exchange, instructions, etc.) and a reference relation between data.

Also, a system or an apparatus includes not only plural computers, hardware, devices and so on interconnected by a communication device such as a network but also a single computer, hardware, device and so on. The word "system" and the word "apparatus" will be used as synonyms.

Image data refer to data in which an image is represented by arranging dots having values and may be called a bitmap image or a raster image. The image data may be compressed or encrypted, but does not include vector information or outline information. A file format in which the image data are stored includes BMP (BitMap), TIFF (Tagged Image File Format), PNG (Portable Network Graphics), JPEG/JPEG2000 (Joint Photographic Experts Group), GIF (Graphics Interchange Format), etc. Also, the image data handled in the exemplary embodiments may be one image or plural pieces of image data. In the exemplary embodiments, it is assumed that image data to be input is multilevel image data (including color images) in which each pixel can take any of three or more states (color, multilevel).

A pixel block includes at least a pixel region (one connectivity component) in which pixels are consecutive in 4-connectivity or 8-connectivity, and also includes a set of such pixel regions. The set of pixel regions may include plural pixel regions in which pixels are consecutive in 4-connectivity or the like, and the plural pixel regions are neighboring pixel regions. Here, the neighboring pixel regions may be ones which are closed to each other in distance, image regions which are vertically or horizontally projected character by character in one row of a sentence and clipped at a blank spot, or image regions clipped in predetermined intervals, etc. Also, when performing character recognition, a character rectangular may be obtained and then black pixels in the character rectangular may be handled as a character.

In many cases, one pixel block corresponds to an image of one character. However, it is not necessary that one pixel block is a pixel region that a human actually can recognize as a character. Some pixel region has a part or none of a character and may be any pixel block no matter what it is. Hereinafter, "character" or "character image" is intended to use as meaning a "pixel block," unless describe otherwise.

Vectorizing includes outlining. Outlining refers to a method for approximating a contour shape of a character image to a curve such as a Bezier curve. An example of this method may include the technique described in disclosed in JP 2006-253892 A. Vectorizing refers to representing not only a character image but also an image of a pixel block with drawing information such as equations (including algorithms and the like) of straight lines, circular arcs, Bezier curves, faces, filling and so on. Hereinafter, outlining is used as an example of the vectorizing, but another vectorizing may be used. Also, the vectorizing includes generating a file in which character codes are assigned to character images.

Also, it may be referred to as a rendering process, to generate image data from vector information.

A file refers to a set of information which have names and are stored or processed as one unit. For example, a file may be a unit of a bundle of programs or data processed by an OS (Operating System) or application software.

<Exemplary Embodiment 1>

An outline of an exemplary embodiment 1 (including exemplary embodiments 1-1 to 1-3) will be described.

In the exemplary embodiment 1, an outlining process for binary images generated by separating a multilevel image into N (N is an integer more than 1) layers is performed. The technique disclosed in JP 2005-228331 A (corresponding to US 2005/0180649 A) may be used to separate a multilevel image into N layers. In other words, the multilevel image may be separated into N layers based on characteristics of colors and characteristics of edges in the multilevel image. In this case, an area surrounding a pixel block including pixels with similar color values and having a continuous boundary may be assumed to be one binary image.

The outlining process is performed for each of the N binary images, a font registration is performed and the N binary images are converted into N character layers and one multilevel image layer. Herein, the font registration refers to creating a font file.

An output data format has one multilevel image layer and N character layers (which may include a font file) each provided with color data.

A font file may be independently formed for each of the N character layers, or a single font file may be formed for the whole image.

A foreground image is referred to as an image mainly consisting of characters or lines. A shape of the foreground image is not changed even if the foreground image is converted into a binary image. The foreground image is an image to be vectorized in the exemplary embodiments described below.

A background image is referred to as an image excluding the foreground image and mainly consists of bases forming a background of a photograph or an image. The background image is one to be represented as a multilevel image.

<Exemplary Embodiment 1-1>

FIG. 1 is a module configuration diagram conceptually showing an exemplary configuration of an exemplary embodiment 1-1. As shown in FIG. 1, the exemplary embodiment 1-1 is configured to include an N-layer separating module 110, a character-layer processing module 121, a character-layer processing module 122, . . . a character-layer processing module 12N, a multilevel-background-layer processing module 129 and an output-file generating module 130.

The N-layer separating module 110 is connected to the character-layer processing module 121, the character-layer processing module 122, . . . the character-layer processing module 12N, the multilevel-background-layer processing module 129 and the output-file generating module 130. The N-layer separating module 110 extracts binary images to be vectorized from an input multilevel image. Also, an image except the extracted binary images may be extracted as a multilevel background image. In other words, the N-layer separating module 110 separates an input image into binary images of N layers for respective colors (one color is assigned to one layer), and a multilevel background image of one layer. The technique disclosed in JP 2005-228331 A (corresponding to US 2005/0180649 A) may be used to separate an image into N layers.

Also, the N-layer separating module 110 may extract a plurality of binary images from the input image, extract color information of each binary image, and then send the color information to the output-file generating module 130. The color information refers to data indicating a representative color of each extracted binary image. Specifically, the color information may include RGB color data, an identifier that identifies a color (e.g., '2' represents 'blue', etc.) or the like.

The character-layer processing module 121, the character-layer processing module 122, . . . and the character-layer processing module 12N are connected to the N-layer separating module 110 and the output-file generating module 130. The character-layer processing module 121, the character-layer processing module 122, . . . and the character-layer processing module 12N vectorize the binary images extracted by the N-layer separating module 110 to generate vector information, and then send the results including the vector information to the output forming module 130 as character-layer data. Although N character-layer processing modules corresponding to layers of the respective binary images are shown in FIG. 1, a single character-layer processing module may process all of the binary images. Alternatively, more than N character-layer processing modules may be provided in advance. This modification may be made in any of exemplary embodiments other than the exemplary embodiment 1-1.

The module configuration and process of the character-layer processing module 121, the character-layer processing module 122, . . . and the character-layer processing module 12N will be described in detail later using exemplary embodiments 1-1-1 to 1-1-4.

The multilevel-background-layer processing module 129 is connected to the N-layer separating module 110 and the output-file generating module 130, and performs a multilevel image encoding process such as a process of compressing an image with JPEG. Specifically, the multilevel-background-layer processing module 129 receives the multilevel background image separated by the N-layer separating module 110, performs a multilevel image encoding process for the received multilevel background image, and sends the process result to the output-file generating module 130. However, the multilevel-background-layer processing module 129 may send the multilevel background image separated by the N-layer separating module 110 to the output-file generating module 130 as it is, without performing the multilevel image encoding process.

The output-file generating module 130 is connected to the N-layer separating module 110, the character-layer processing module 121, the character-layer processing module 122, . . . the character-layer processing module 12N and the multilevel background-layer processing module 129. The output-file generating module 130 receives the color information of the respective character layers from the N-layer separating module 110, receives the character-layer data from the character-layer processing module 121, the character-layer processing module 122, . . . and the character-layer processing module 12N, receives the result of the multilevel image encoding process from the multilevel background-layer processing module 129. Then, the output-file generating module 130 generates an output file 300. At the time of generating the output file 300, the output-file generating module 130 adds color information of each character layer to the character-layer data.

Herein, an example of a data structure of the output file 300 generated by the output-file generating module 130 will be described with reference to FIG. 3.

The output file 300 includes N pieces of character-layer data, N pieces of corresponding color information, and background-layer data which is a multilevel image. Specifically, the output file 300 includes background-layer data 399, a character color 1 301A, character-layer data 1 301B, a character color 2 302A, character-layer data 2 302B, . . . a character color N 30NA and character-layer data N 30NB. The number of the pairs of the character-layer data and the color information is N. The character color 1 301A, the character color 2 302A, . . . and the character color N 30NA are color information passed from the character-layer processing modules 121, 122 and 12N, respectively. The character-layer data 1 301B, the character-layer data 2 302B and the character-layer data N 30NB corresponding thereto are color layer data passed from the N-layer separating module 110. The background-layer data 399 is encoded data that is passed from the multilevel background-layer processing module 129.

Also, the character-layer data may be vector information, which are the processing results by the respective character-layer processing modules, that is, ones that are generated by outlining the binary images as they are. Alternatively, the character-layer data may be an output file generated in the exemplary embodiment 1-2. More specifically, the character-layer data may be character-layer data 2710 which will be described in an exemplary embodiment 3.

Figure 2:
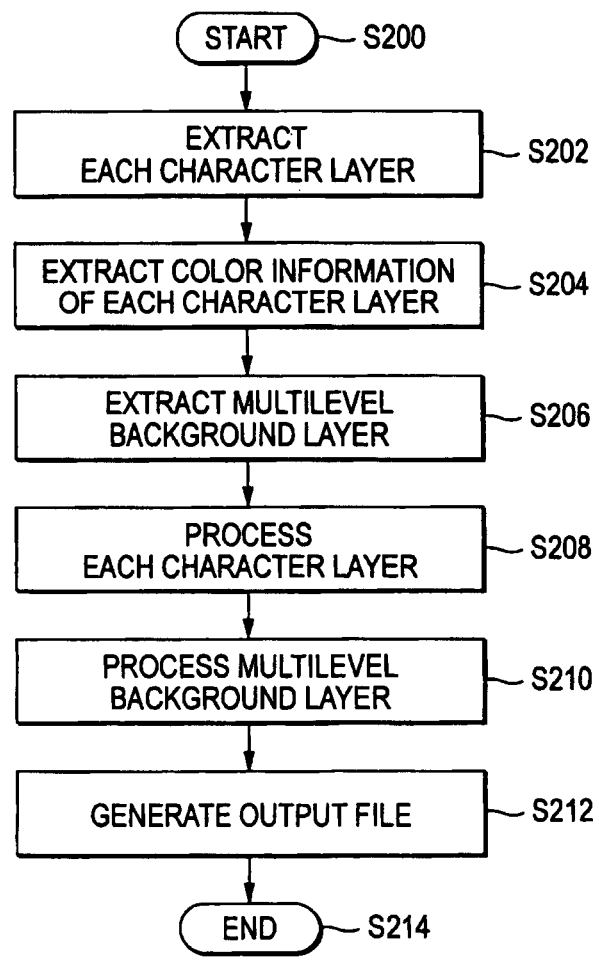
FIG. 2 is a flow chart showing an exemplary process according to the exemplary embodiment 1-1.

An exemplary process according to the exemplary embodiment 1-1 will be described with a flow chart shown in FIG. 2.

In Step S202, the N-layer separating module 110 extracts from a multilevel image images to be vectorized, i.e., character layers, as a binary image.

In Step S204, the N-layer separating module 110 extracts color information of the respective character layers.

In Step S206, the N-layer separating module 110 extracts a background layer as a multilevel image.

In Step S208, the character-layer processing modules 121, 122, . . . and 12N vectorize the respective character layers extracted in Step S202.

In Step S210, the multilevel-background-layer processing module 129 performs the encoding process for the background layer extracted in Step S206.

In Step S212, the output-file generating module 130 adds the color information extracted in Step S204 to the result obtained in Step S208, and synthesizes the result obtained in Step S210 to generate an output file.

Although the exemplary process according to the exemplary embodiment 1-1 has been described with reference to the flow chart shown in FIG. 2, the process does not necessarily follow the shown sequence, but, for example, the processes in Steps S202 to S206 may be performed in any order or may be performed in parallel. This may be likewise applied to the processes in Steps S208 and S210.

<Exemplary Embodiment 1-1-1 to 1-1-4>

The configuration of the character-layer processing modules of the exemplary embodiment 1-1 will be described in detail using the exemplary embodiments 1-1-1 to 1-1-4. Any of the exemplary embodiments 1-1-1 to 1-1-4 may be incorporated into the character-layer processing modules of the exemplary embodiment 1-1.

Input images shown in the exemplary embodiments 1-1-1 to 1-1-4 are the images (binary images) input to the respective character-layer processing modules. In other words, the input images are the binary images passed from the N-layer separating module 110. Output files shown in the exemplary embodiments 1-1-1 to 1-1-4 are character data which are output data of the respective character-layer processing modules. However, the output files may not necessarily have a file format, but, for example, may be stored in a memory and passed from the memory to the output-file generating module 130.

<Exemplary Embodiment 1-1-1>

Figure 4:
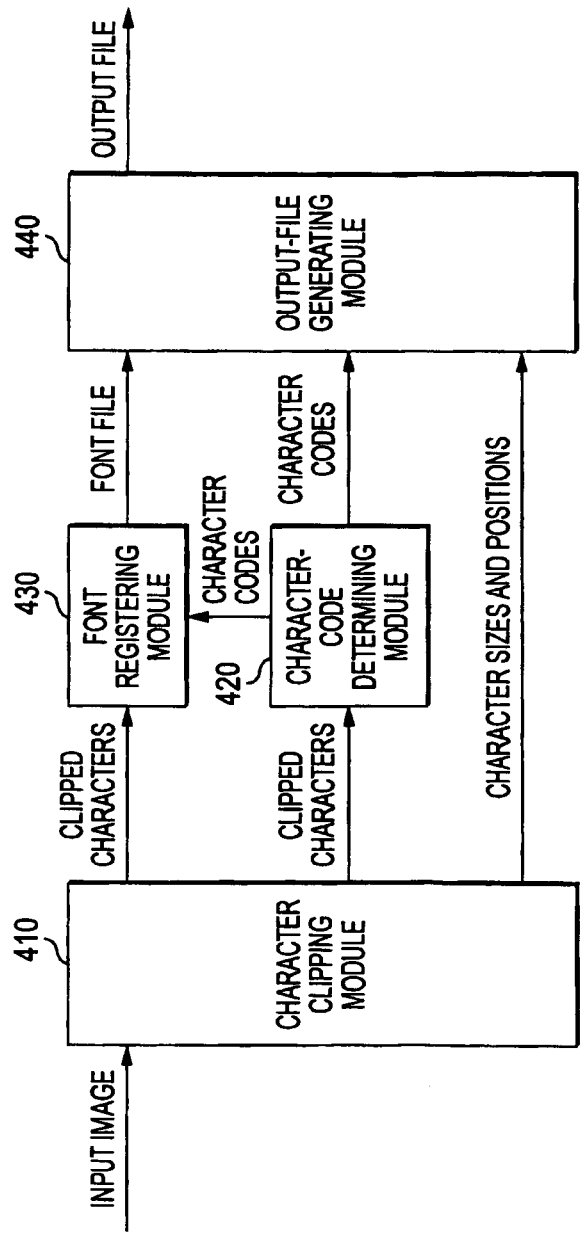
FIG. 4 is a module configuration diagram conceptually showing an exemplary configuration of an exemplary embodiment 1-1-1.

FIG. 4 is a module configuration diagram conceptually showing the configuration example of an exemplary embodiment 1-1-1.

In this exemplary embodiment, as shown in FIG. 4, an image processing apparatus includes a character clipping module 410, a character-code determining module 420, a font registering module 430 and an output-file generating module 440.

As shown in FIG. 4, the character clipping module 410 is connected to the character-code determining module 420, the font registering module 430 and the output-file generating module 440 and clips character images (pixel blocks) from an input image. The character clipping module 410 transmits the clipped character images to the character-code determining module 420 and the font registering module 430 and transmits a character size of each clipped character image and a position of each clipped character image in the input image to the output-file generating module 440.

As shown in FIG. 4, the character-code determining module 420 is connected to the character clipping module 410, the font registering module 430 and the output-file generating module 440 and assigns (determines), to each character image clipped by the character clipping module 410, a character code that uniquely identifies each clipped character image. Any assignment method may be used so long as each assigned code uniquely identifies the corresponding character image in the input image. For example, the character codes may be assigned in order of an appearance frequency. However, if a result of process in this exemplary embodiment is used in character processing software such as a word processor, an escape code or the like may not to be assigned. Also, a character code such as JIS (Japanese Industrial Standards) code may be assigned after character recognition is performed, or an extended character code that is a character shape excluded from a character code system in consideration may be assigned. It is noted that accuracy of the character recognition does not depend on reproduction of the input image.

The assigned character codes are transmitted to the font registering module 430 and the output-file generating module 440.

As shown in FIG. 4, the font registering module 430 is connected to the character clipping module 410, the character-code determining module 420 and the output-file generating module 440 and associates each character image clipped by the character clipping module 410 with the corresponding character code assigned by the character-code determining module 420. That is, the character images (outlined one, that is, one including outline data) corresponding to the respective character codes are registered in a font file format (prepared as a font file). In other words, respective fonts can be later referred to using the character codes, and an original image can be reproduced when a character code, a character position and a character size are specified. The registered font file is transmitted to the output-file generating module 440.

As shown in FIG. 4, the output-file generating module 440 is connected to the character clipping module 410, the character-code determining module 420 and the font registering module 430, receives the character sizes and positions of the character images clipped by the character clipping module 410, the character codes determined by the character-code determining module 420 and the font file registered by the font registering module 430 and bringing them into one file (generate one file based on them). Thus generated file may be encoded.

Also, the character sizes and positions are not required for all of character codes. If the character sizes and positions can be relatively determined, only a required portion may be specified For example, if the character size is not changed, it may be first specified once. If a Y coordinate is not changed, only an X coordinate may be specified. If the size of the font is fixed, it is not necessary to specify the size.

The generated file in the output-file generating module 440 is output as an output file. A format of the output file may be any one so long as it can contain font information, for example, PDF (Portable Document Format; registered trademark) may be used.

Figure 5:
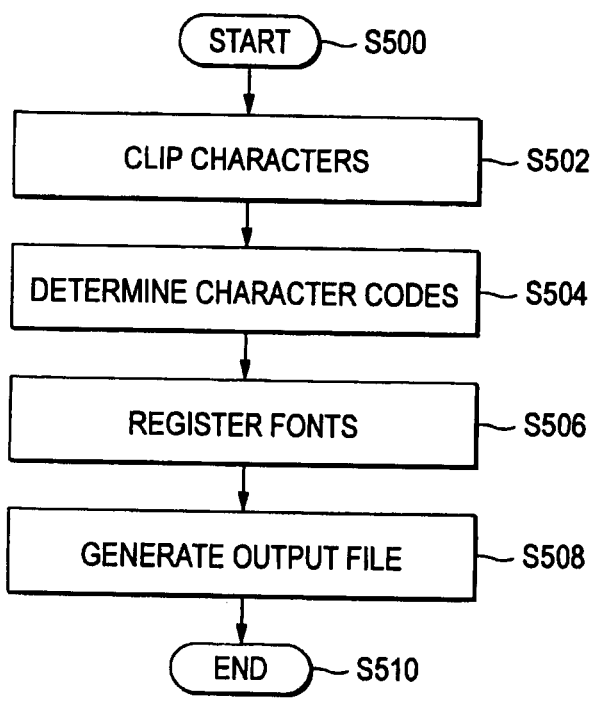
FIG. 5 is a flow chart showing an exemplary process according to the exemplary embodiment 1-1-1.

Next, operation and action of the modules of the image processing apparatus according to the exemplary embodiment 1-1-1 will be described. An image processing method according to the exemplary embodiment 1-1-1 will be described with reference to a flow chart shown in FIG. 5.

In step S502, the character clipping module 410 clips all character images from an input image and extracts character sizes and positions of the character images.

In step S504, the character-code determining module 420 assigns character codes to the respective character images clipped in step S502.

In step S506, the font registering module 430 generates a font file by associating the character images clipped in step S502 and the character codes assigned in step S504.

In step S508, the output-file generating module 440 bringing the character sizes and positions extracted in step S502, the character codes assigned in step S503 and the font file generated in step S506 together to generate an output file.

Also, although all the character images are clipped in step S502, one character image may be clipped and then processes in steps S504 to S508 may be performed. In this case, steps S502 to S508 are repeatedly performed.

<Exemplary Embodiment 1-1-2>

Figure 6:
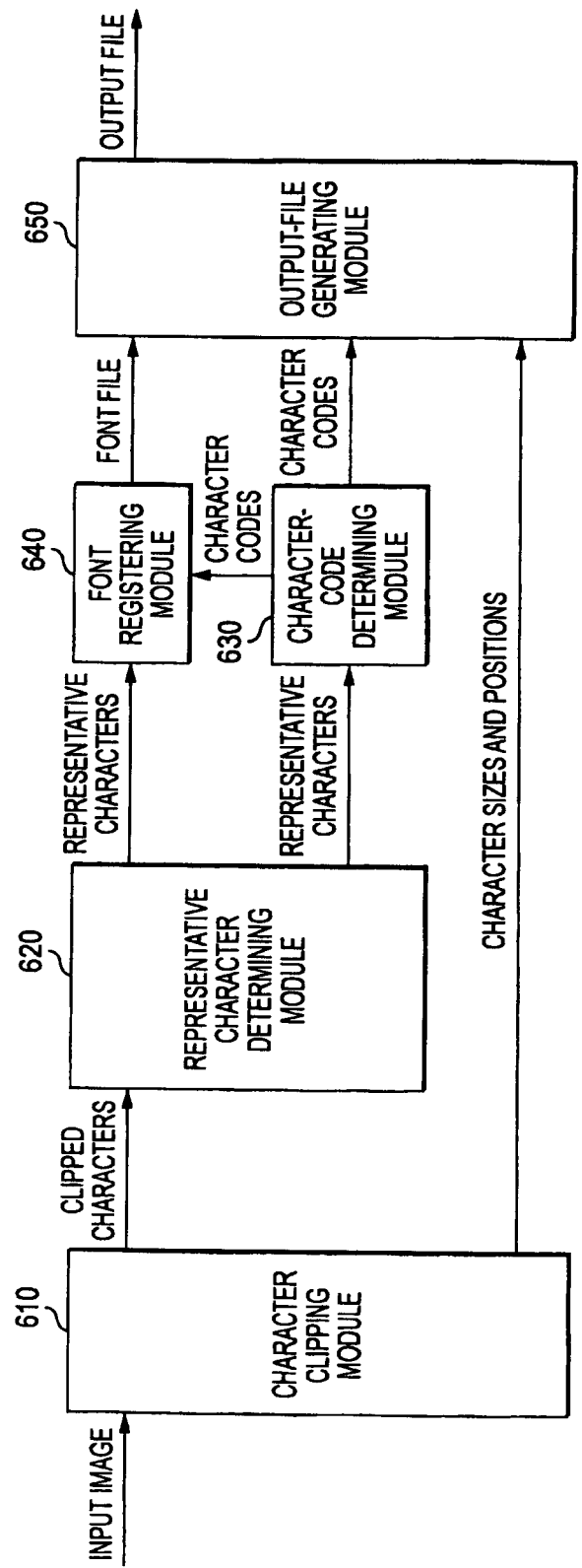
FIG. 6 is a module configuration diagram conceptually showing an exemplary configuration of an exemplary embodiment 1-1-2.

FIG. 6 is a module configuration diagram conceptually showing the configuration example of an image processing apparatus according to an exemplary embodiment 1-1-2. In the exemplary embodiment 1-1-2, a representative-character determining module 620 is added to the configuration of the exemplary embodiment 1-1-1.

As shown in FIG. 6, a character clipping module 610 is connected to a representative-character determining module 620 and an output-file generating module 650. The character clipping module 610 has the same function as the character clipping module 410 of the exemplary embodiment 1-1-1, transmits clipped character images to the representative-character determining module 620, and transmits character sizes of the clipped character images and positions of the clipped character images in an input image to the output-file generating module 650.

As shown in FIG. 6, the representative-character determining module 620 is connected to the character clipping module 610, a character-code determining module 630 and a font registering module 640. The representative-character determining module 620 compares the character images clipped by the character clipping module 610 to collect character images having a similar shape. That is, the representative character determining module 620 generates representative images based on similarities between character images in the binary image and other character images.

An example of a method for examining similarity between characters to determine a representative character will be described below:

(1) Input two binary images that are clipped character images.

(2) Align centers of gravity of black pixels of the two input binary image.

(3) Perform XOR (exclusive OR) operation for the two input binary image having the aligned the centers of gravity.

(4) Count the number of pixels (different pixels) which have 1 in logical value as a result of the XOR operation. If the number of pixels is less than a threshold value, determine that the two binary images are similar character images.

(5) Calculate similarities between the clipped character image and the other character images using the above methods and bring similar character images together sequentially.

(6) Standardize the similar character images to generate a representative character.

That is, by generating the representative character, the character images which are parts of image data in the input image are standardized. Specifically, standardizing the character image may include generating one common representative character from plural character images, selecting one character image as a representative character from plural character images or the like.

Accordingly, for example, the representative character may be a character image generated by calculating an average value of similar character images and binarizing the calculated average value, one selected from similar character images, or the like.

Also, whether or not character images are similar may be determined by clustering the clipped character images treated as one vector data and extracting character images similar to a character image in question from the clipped character images. In this case, if a distance between vector data representing the character image in question and vector data representing a target character image (for example, an Euclid distance, etc.) is less than a predetermined value (that is, if a distance between two pieces of vector data is small), it is determined that the character image in question and the target character image are similar to each other.

Also, an expanded image may be generated based on a resultant image of logical operation performed for two character image patterns, and similarity may be determined based on a ratio of overlap with the expanded image. That is, the similarity may be determined depending on a degree of expansion (expansion radius) in perfect concord.

Also, methods described in JP Hei. 7-200745 A (corresponding to U.S. Pat. No. 5,539,841), "Managing Gigagytes" Morgan Kaufmmann Publishers pp. 320-332 which are authored by I. H. Witten, A. Mofat, and T. C. Bell, etc. may be used.

Similarity refers to an amount that becomes the maximum if two images are congruent and that decreases depending on a degree of difference therebetween.

Instead of the similarity, an amount that becomes the minimum if two images are congruent and that increases depending on a degree of difference therebetween may be used. In this case, this amount is called "distance" or "dissimilarity." "Distance" refers to a gap between images in a space where the images are placed when the images are represented by vectors (for example, when pixel values are represented by vectors, features of images are represented by vectors, etc.). For example, this distance may include an Euclid distance, a Manhattan distance, a Hausdorff distance, a Mahalanobis distance, angle $\theta$ between vectors, $\cos \theta$, the square of $\cos \theta$ or the like.

The term "similarity" include the term "similarity degree," "distance" or "difference." Accordingly, the expression "generating a representative image based on a similarity" includes the meaning "generating a representative image using one having a high similarity or the meaning "generating a representative image using one having a small distance (one having a small difference). Hereinafter, judgment in comparing, such as "high," "low," "close," "large," and "similar," is made by comparing with a threshold value. Also, the threshold value may be determined in advance or in accordance with a status (a status of an image in a binary image). The status of the image in the binary image may include a size of a character image.

As shown in FIG. 6, the character-code determining module 630 is connected to the representative-character determining module 620, the font registering module 640 and the output-file generating module 650 and has the same function as the character-code determining module 420 of the exemplary embodiment 1-1-1 except that input character images are the representative characters generated by the representative-character determining module 620. It is noted that the character-code determining module 630 assigns a character code (this assigning includes recognizing characters) only to each representative character of similar character images. That is, the same character code is assigned to the similar character images.

As shown in FIG. 6, the font registering module 640 is connected to the representative-character determining module 620, the character-code determining module 630 and the output-file generating module 650 and has the same function as the font registering module 430 of the exemplary embodiment 1-1-1 except that input character images are the representative characters generated by the representative-character determining module 620. It is noted that the font registering module 640 assigns one character code to similar character images (a character image that appears in the input character image plural times), and one font corresponds to the one character code.

As shown in FIG. 6, the output file forming module 650 is connected to the character clipping module 610, the character-code determining module 630 and the font registering module 640 and has the same function as the output-file generating module 440 of the exemplary embodiment 1-1-1. It is noted that one font corresponds to similar character images. Accordingly, if an original image (input image) is reproduced using an output file generated by the output-file generating module 650, the original image is drawn by referring to one font plural times (equal to the number of times a similar character image appears in the input character image).

Figure 7:
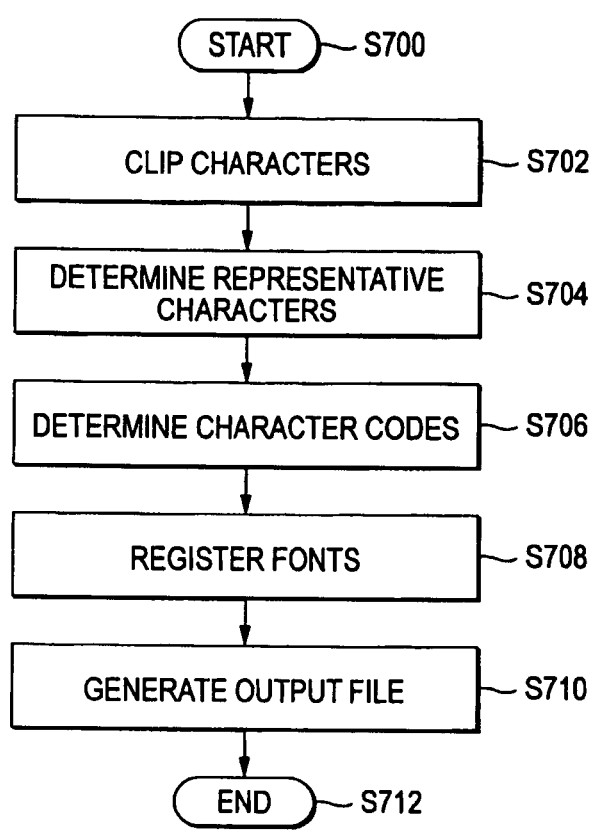
FIG. 7 is a flow chart showing an exemplary process according to the exemplary embodiment 1-1-2.

Next, operation and action of the modules of the image processing apparatus according to the exemplary embodiment 1-1-2 will be described. An image processing method according to the exemplary embodiment 1-1-2 will be described with reference to a flow chart shown in FIG. 7.

In step S702, the character clipping module 610 clips all character images from an input image and extracts character sizes and positions of the character images.

In step S704, the representative-character determining module 620 determines representative characters from the character images clipped in step S702.

In step S706, the character-code determining module 630 assigns a character code to each representative character determined in step S704.

In step S708, the font registering module 640 generates a font file by associating the representative characters determined in step S704 and the character codes assigned in step S706.

In step S710, the output-file generating module 650 brings the character sizes and positions extracted in step S702, the character codes assigned in step S706 and the font file generated in step S708 together to generate the output file.

<Exemplary Embodiment 1-1-3>

Figure 8:
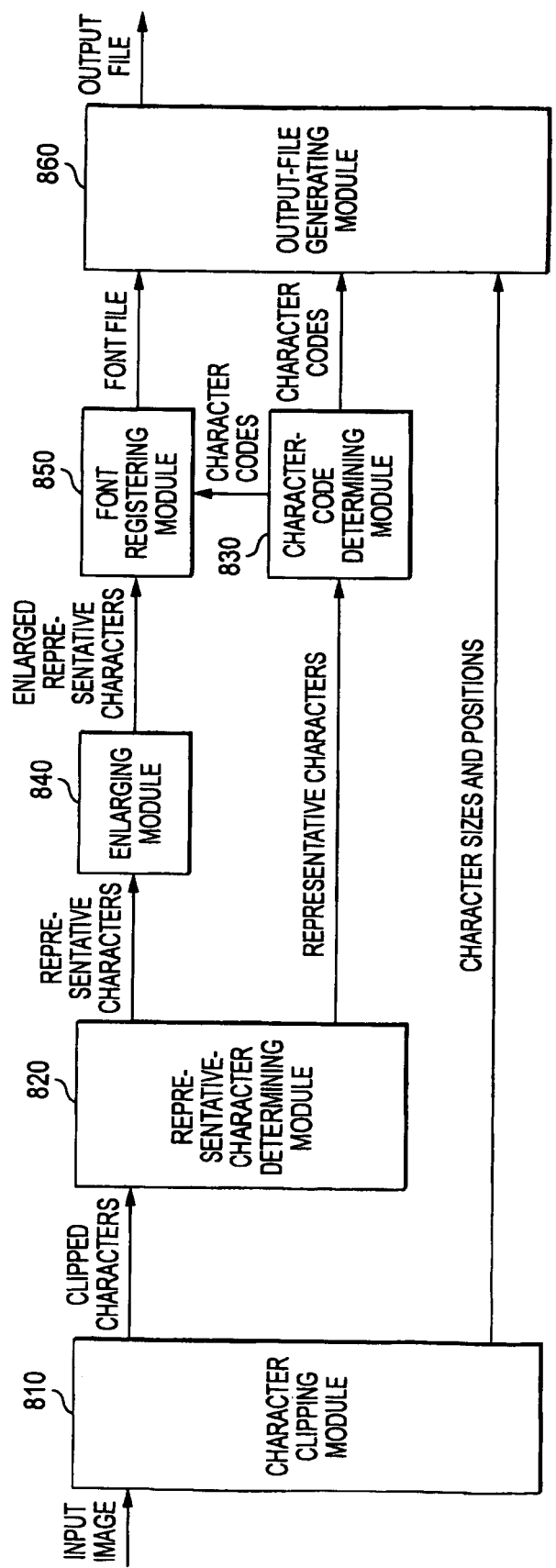
FIG. 8 is a module configuration diagram conceptually showing an exemplary configuration of an exemplary embodiment 1-1-3.

FIG. 8 is a module configuration diagram conceptually showing the configuration example of an image processing apparatus according to an exemplary embodiment 1-1-3. In the exemplary embodiment 1-1-3, an enlarging module 840 is added to the configuration of the exemplary embodiment 1-1-2.

As shown in FIG. 8, a character clipping module 810 is connected to a representative-character determining module 820 and an output-file generating module 860 and has the same function as the character clipping module 610 of the exemplary embodiment 1-1-2.

As shown in FIG. 8, the representative-character determining module 820 is connected to the character clipping module 810, a character-code determining module 830 and the enlarging module 840 and has the same function as the representative-character determining module 620 of the exemplary embodiment 1-1-2 except that the determined representative-characters are transmitted to the enlarging module 840.

As shown in FIG. 8, the enlarging module 840 is connected to the representative-character determining module 820 and a font registering module 850, receives the representative characters determined by the representative-character determining module 820 and enlarges the representative characters (that is, generates character images having a higher resolution). That is, the entire input image is not enlarged, but the representative characters determined by the representative-character determining module 820 are enlarged. A method of enlarging the representative characters will be described later with reference to FIG. 10. Then, the enlarging module 840 transmits the enlarged representative characters to the font registering module 850.

As shown in FIG. 8, the character-code determining module 830 is connected to the representative-character determining module 820, the font registering module 850 and the output-file generating module 860 and has the same function as the character-code determining module 630 of the exemplary embodiment 1-1-2.

As shown in FIG. 8, the font registering module 850 is connected to the character-code determining module 830, the enlarging module 840 and the output-file generating module 860 and has the same function as the font registering module 640 of the exemplary embodiment 1-1-2 except that the input character images are the representative characters enlarged by the enlarging module 840.

Also, the font registering module 850 may perform the following processes:

There may be a case where the same character code is assigned to different representative characters by the character-code determining module 830 (particularly in a case where character recognition is performed). In this case, the different representative characters may be registered as different font species.

That is, the following processes are performed:

(1) Register font species X (X=0, 1, 2, . . . ).

(2) Perform character recognition for a representative character and it is assumed that a character code is Y. Register the representative character having the character code Y in the font species X. It is also assumed that this font species X has the smallest value of X among the font species X in which the character code Y is not registered.

(2-1) That is, if the character code Y appears first, the character code Y is registered in a font species 0.

(2-2) If the character code Y is registered in font species 0, 1, . . . , N-1, the character code Y is registered in a font species N.

As shown in FIG. 8, the output-file generating module 860 is connected to the character clipping module 810, the character-code determining module 830 and the font registering module 850 and has the same function as the output-file generating module 650 of the exemplary embodiment 1-1-2.

Figure 9:
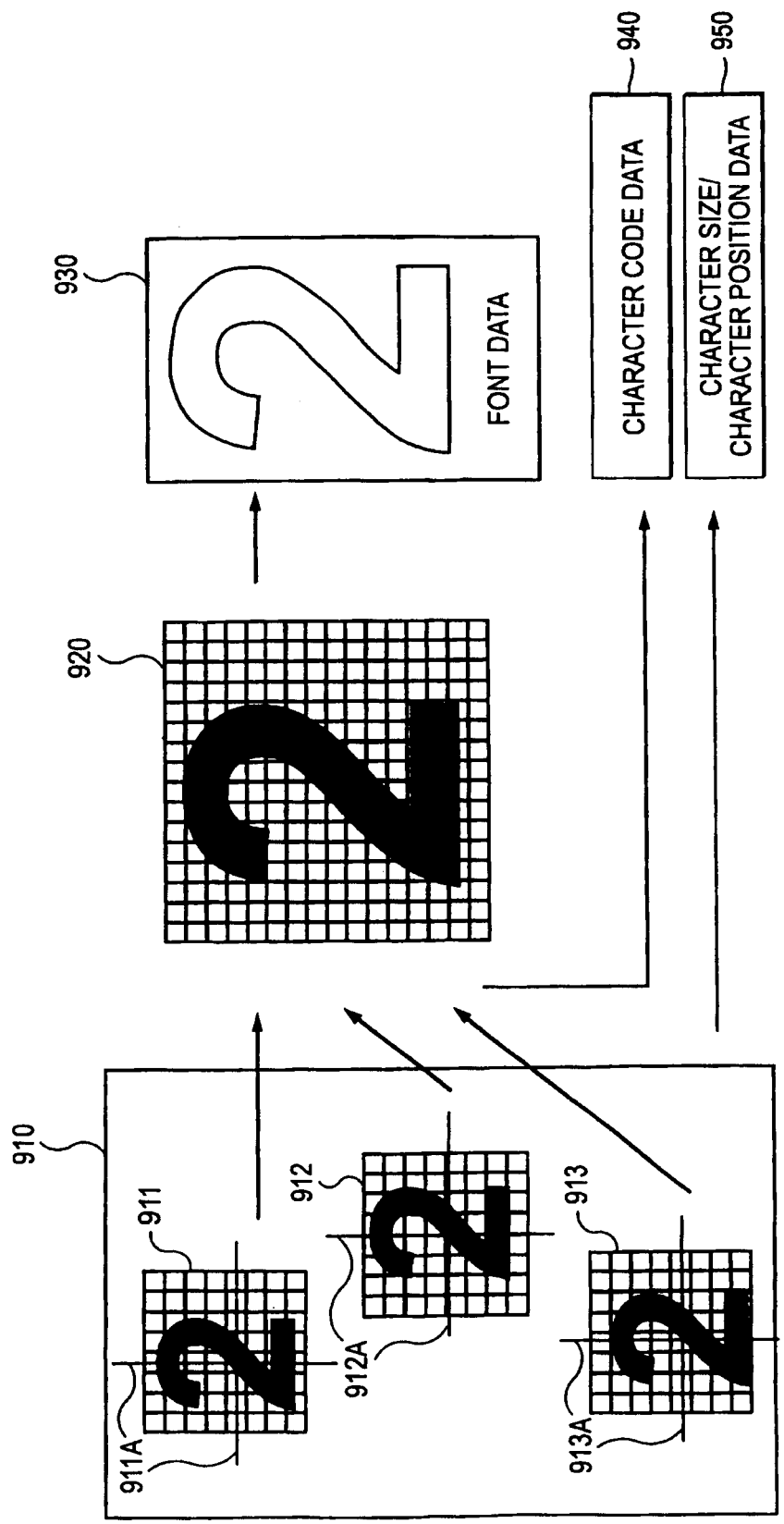
FIG. 9 is an explanatory diagram showing an exemplary process according to the exemplary embodiment 1-1-3.

Now, a process example of the exemplary embodiment 1-1-3 will be described with reference to FIG. 9.

The character clipping module 810 sets an input image 910 having several characters "2" as a target image. As shown in FIG. 9, the character clipping module 810 clips a character image 911, a character image 912 and a character image 913 from the input image 910 at resolution of the character image 911. Then, the character clipping module 810 extracts character size/character position data 950 from the input image 910.

The representative-character determining module 820 determines that these character images of "2" are similar to each other.

The character-code determining module 830 assigns character-code data 940 to the character images of "2." The enlarging module 840 obtains centers of gravity of the character image 911, the character image 912 and the character image 913 (intersecting points between central lines 611A and so on) and moves phases so that the centers of gravity coincide with each other, to generates a high-resolution character image 920.

The font registering module 850 generates font data 930 as outline information from the high-resolution character image 920.

The output-file generating module 860 generates the output file from the font data 930, the character-code data 940 and the character size/character position data 950.

An example of a process performed by the enlarging module 840 will be described with reference to FIG. 10.

Figure 10A:
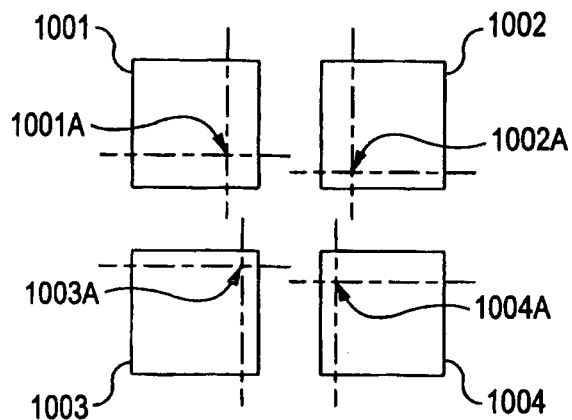
FIGS. 10A to 10E are explanatory diagrams showing an exemplary process of generating a high resolution character image data by an enlarging module.

FIG. 10(A) shows sampling lattices (first sampling latticesS1301, 1002, 1003 and 1004) and center-of-gravity positions of character images (centers of gravity 1001A, 1002A, 1003A and 1004A) at a resolution (first resolution) of the input image 910.

Figure 10B:
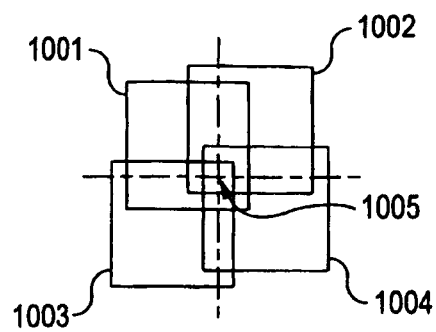

As shown in FIG. 10(B), first, the enlarging module 840 moves phases of the four sampling lattices based on the centers of gravity of the character images. That is, the enlarging module 840 causes the centers of gravity 1001A, 1002A, 1003A and 1004R to coincide with the center of gravity 1005 A, to generate an image shown in FIG. 10(B).

Figure 10C:
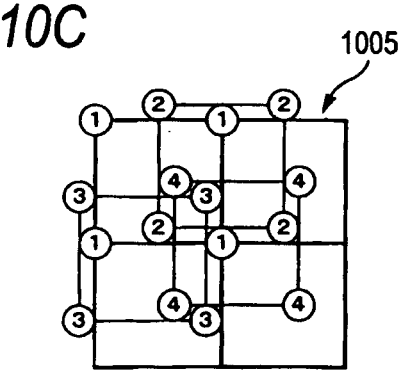
Figure 10D:
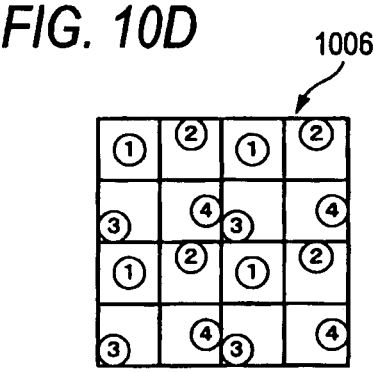

FIGS. 10(C) and 10(D) are views illustrating an example of a method for setting sampling lattices having a second resolution higher than the first resolution. Circled numbers (1, 2, 3 and 4) shown in FIG. 10(C) exemplify values of the character images at the first resolution. Here, the character images are plotted such that the circled numbers are indicated on lattice points of the sampling lattices at the first resolution.

In FIG. 10(D), second sampling latticeS1306 are sampling lattices of a high resolution image.

When the phases of the four sampling lattices at the first resolution are moved, the enlarging module 840 sets the sampling lattices at the second resolution as shown in FIG. 10(C), and moves phases of the sampling lattices at the second resolution so that the centers of gravity of the character images coincide with each other as shown in FIG. 10(D).

Figure 10E:
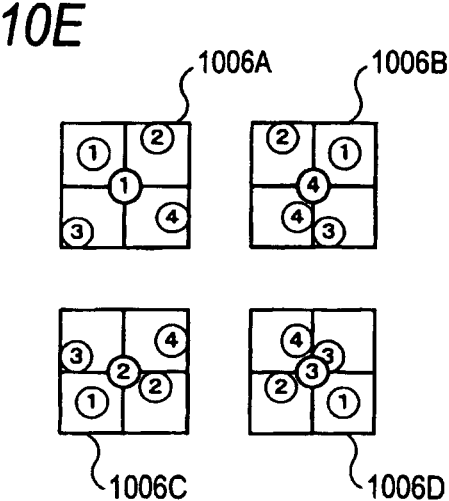

FIG. 10(E) is a view illustrating an example of a method for calculating values of the character images at the second resolution. Circled numbers at centers of second sampling lattice S1306A, 1006B, 1006C and 1006D exemplify values of the character images at the second resolution. Here, the character images at the second resolution are shown such that the circled numbers at the centers of the character images are indicated on lattice points of the sampling lattices at the second resolution.

Also, the enlarging module 840 interpolates pixel values of the character images at the second resolution from the pixel values of the respective character images based on the phases of the respective character images at the first resolution. In this example, the enlarging module 840 interpolates the pixel values of the character images at the second resolution by applying a nearest neighbor interpolation method. That is, the enlarging module 840 selects a value nearest to each sampling lattice point at the second resolution from among the four values (circled numbers 1, 2, 3 and 4 in FIG. 10(E)) of the character images at the first resolution, and sets the selected value to a value of each character image at the second resolution. Specifically, a value nearest to the center in the second sampling lattice 1006A is "1" which is set to be a value of the character image at the second resolution (a circled number is 1). Also, the interpolation method is not limited to the above method, but may be applied with any other methods (for example, a linear interpolation method or the like).

Also, the process performed by the enlarging module 840 is not limited to the above-described process, but may be linear interpolation, cubic convolution or the like.

Next, operation and action of the modules of the image processing apparatus according to the exemplary embodiment 1-1-3 will be described. An image processing method according to the exemplary embodiment 1-1-3 will be described with reference to a flow chart shown in FIG. 11.

In step S1102, the character clipping module 810 clips all character images from an input image and extracts character sizes and positions of the character images.

In step S1104, the representative-character determining module 820 determines representative characters from the character images clipped in step S1102.

In step S1106, the character-code determining module 830 assigns a character code to each representative character determined in step S1104.

In step S1108, the enlarging module 840 enlarges the representative characters determined in step S1104.

In step S1110, the font registering module 850 generates a font file by associating the representative characters enlarged in step S1108 and the character codes assigned in step S1106.

In step S1112, the output-file generating module 860 brings the character sizes and positions extracted in step S1102, the character codes assigned in step S1106 and the font file generated in step S1110 together to generate an output file.

<Exemplary Embodiment 1-1-4>

Figure 12:
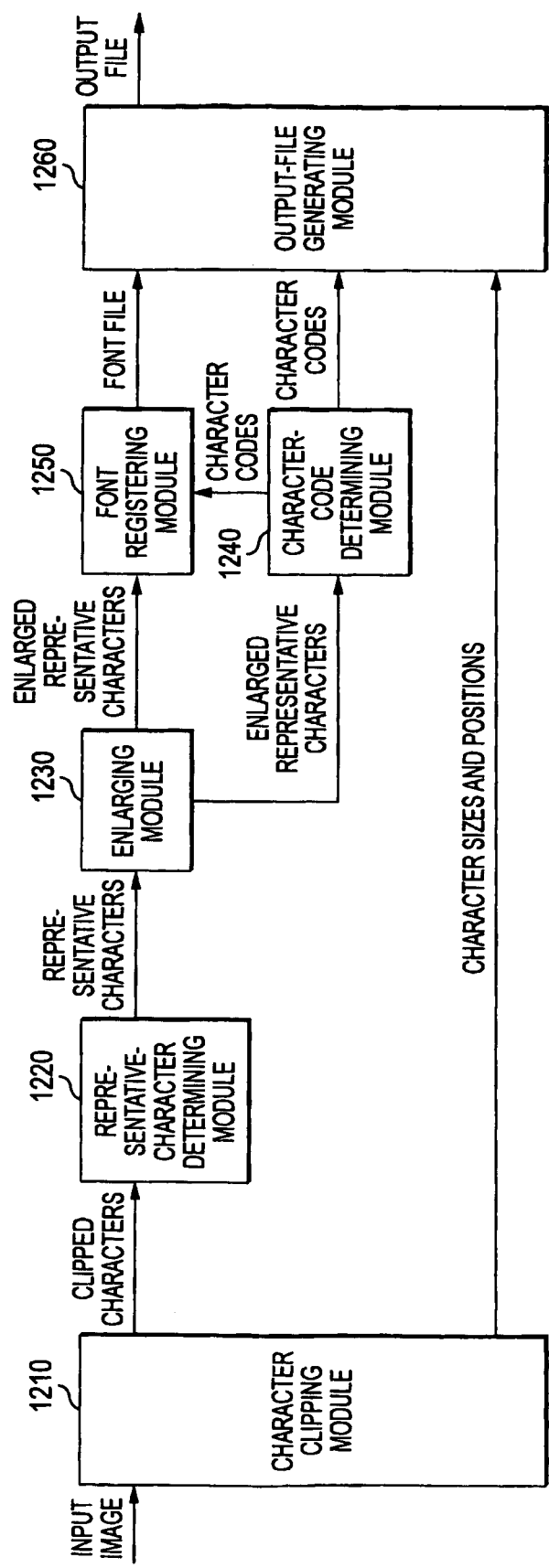
FIG. 12 is a module configuration diagram conceptually showing an exemplary configuration of an exemplary embodiment 1-1-4.

FIG. 12 is a module configuration diagram conceptually showing the configuration example of an image processing apparatus according to an exemplary embodiment 1-1-4. The exemplary embodiment 1-1-4 is different from the exemplary embodiment 1-1-3 in that a character-code determining module 1240 of the exemplary embodiment 1-1-4 determines a character code for each enlarged representative character.

As shown in FIG. 12, a character clipping module 1210 is connected to a representative-character determining module 1220 and an output-file generating module 1260 and has the same function as the character clipping module 810 of the exemplary embodiment 1-1-3.

As shown in FIG. 12, the representative-character determining module 1220 is connected to the character clipping module 1210 and an enlarging module 1230 and has the same function as the representative-character determining module 820 of the exemplary embodiment 1-1-3 except that the representative characters are transmitted only to the enlarging module 1230.

As shown in FIG. 12, the enlarging module 1230 is connected to the representative-character determining module 1220, the character-code determining module 1240 and a font registering module 1250 and has the same function as the enlarging module 840 except that the enlarged representative characters are also transmitted to the character-code determining module 1240.

As shown in FIG. 12, the character-code determining module 1240 is connected to the enlarging module 1230, the font registering module 1250 and the output-file generating module 1260, receives the representative characters enlarged by the enlarging module 1230 and assigns a character code to each enlarged representative character. The enlarged representative characters are processed to have a higher resolution, and, for example, character recognition having less error may be performed as a process of assigning character codes. Also, the character codes are transmitted to the font registering module 1250 and the output-file generating module 1260.

As shown in FIG. 12, the font registering module 1250 is connected to the enlarging module 1230, the character-code determining module 1240 and the output-file generating module 1260 and has the same function as the font registering module 820 of the exemplary embodiment 1-1-3.

As shown in FIG. 12, the output-file generating module 1260 is connected to the character clipping module 1210, the character-code determining module 1240 and the font registering module 1250 and has the same function as the output-file generating module 860 of the exemplary embodiment 1-1-3.

Figure 13:
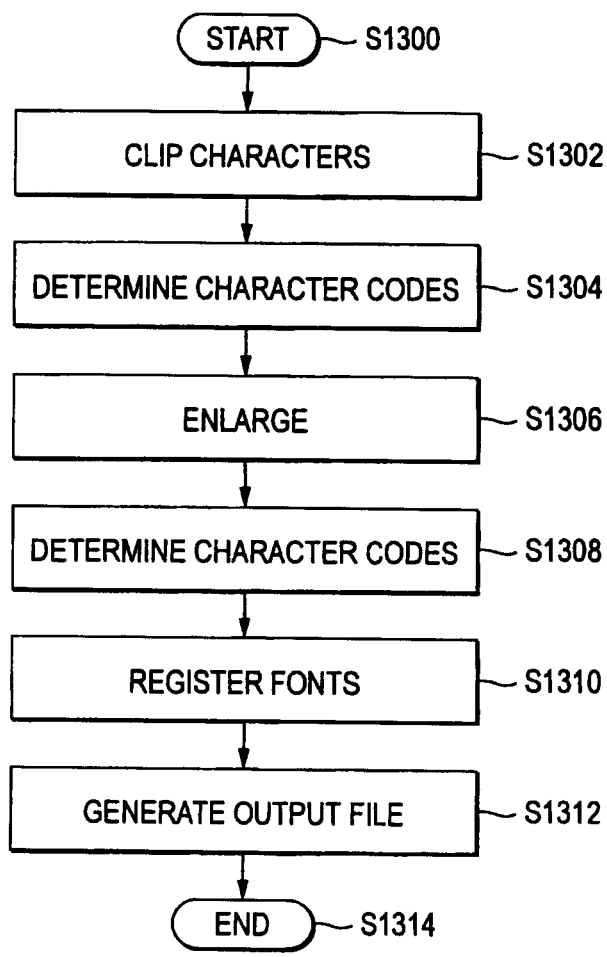
FIG. 13 is a flow chart showing an exemplary process according to the exemplary embodiment 1-1-4.

Next, operation and action of the modules of the image processing apparatus according to the exemplary embodiment 1-1-4 will be described. An image processing method according to the exemplary embodiment 1-1-4 will be described with reference to a flow chart shown in FIG. 13.

In step S1302, the character clipping module 1210 clips all character images from the input image and extracts character sizes and positions of the character images.

In step S1304, the representative-character determining module 1220 determines representative characters from the character images clipped in step S1302.

In step S1306, the enlarging module 1230 enlarges the representative characters determined in step S1304.

In step S1308, the character-code determining module 1240 assigns a character code to each representative character expanded in step S1306.

In step S1310, the font registering module 1250 generates a font file by associating the representative characters enlarged in step S1306 and the character codes assigned in step S1308.

In step S1312, the output-file generating module 1260 brings the character sizes and positions extracted in step S1302, the character codes assigned in step S1308 and the font file generated in step S1310 together, to generate an output file.

Although the exemplary embodiments 1-1-1 to 1-1-4 adopt the character codes, font codes may be adopted instead thereof. Font codes refer to identification signs that identify clipped character images. That is to say, an original image may be generated by generating a correspondences table between font codes and character images and extracting character images from the table. Specifically, numbers may be assigned in order of appearance of the character images.

<Exemplary Embodiment 1-2>

Figure 14:
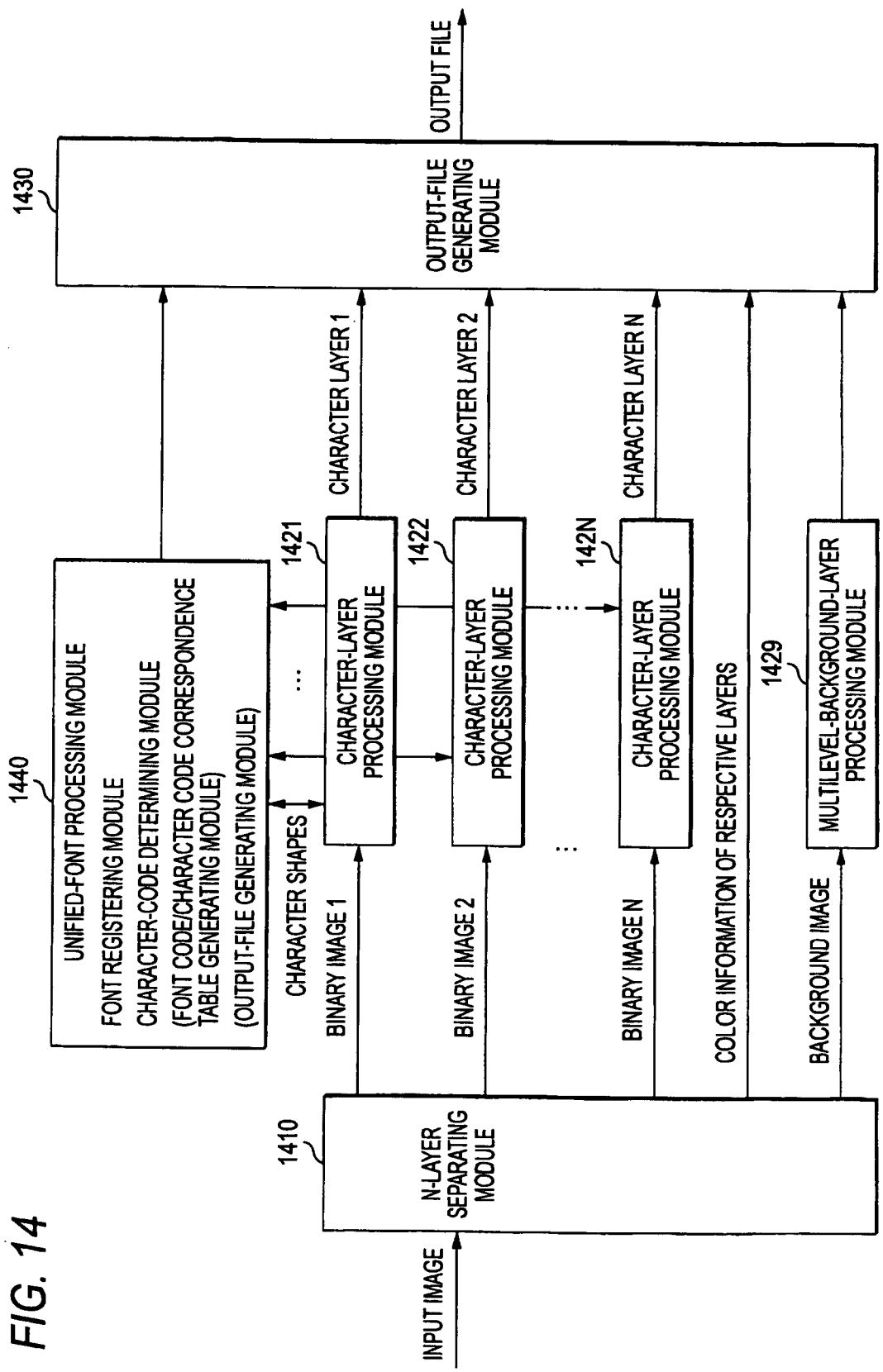
FIG. 14 is a module configuration diagram conceptually showing an exemplary configuration of an exemplary embodiment 1-2.

FIG. 14 is a module configuration diagram conceptually showing an exemplary configuration of the exemplary embodiment 1-2.

Although the respective character-layer processing modules separately perform the font registering process and the character code determining process in the exemplary embodiment 1-1, these processes are performed integrally.

The exemplary embodiment 1-2 is configured to include an N-layer separating module 1410, a character-layer processing module 1421, a character-layer processing module 1422, ..., a character-layer processing module 142N, a multilevel-background-layer processing module 1429, an output-file generating module 1430 and a unified-font processing module 1440.

The N-layer separating module 1410 is connected to the character-layer processing module 1421, the character-layer processing module 1422, ... the character-layer processing module 142N, the multilevel-background-layer processing module 1429 and the output-file generating module 1430. The N-layer separating module 1410 has the same function as the N-layer separating module 110 of the exemplary embodiment 1-1.

The multilevel-background-layer processing module 1429 is connected to the N-layer separating module 1410 and the output-file generating module 1430, and has the same function as the multilevel-background-layer processing module 129 of the exemplary embodiment 1-1.

The output-file generating module 1430 is connected to the N-layer separating module 1410, the character-layer processing module 1421, the character-layer processing module 1422, ..., the character-layer processing module 142N, the multilevel-background-layer processing module 1429 and the unified-font processing module 1440. The output-file generating module 1430 has the same function as the output-file generating module 130 of the exemplary embodiment 1-1 and generates the output file 300.

The unified-font processing module 1440 is connected to the character-layer processing modules 1421, 1422, ... and 142N and the output-file generating module 1430.

The unified-font processing module 1440 includes font registering modules (corresponding to the font registering modules 430, 640, 850 and 1250 in the exemplary embodiments 1-1-1 to 1-1-4) in the character-layer processing modules 121, 122, ... and 12N of the exemplary embodiment 1-1, and character-code determining modules (corresponding to the character-code-determining modules 420, 630, 830 and 1240 in the exemplary embodiments 1-1-1 to 1-1-4) in the character-layer processing modules 121, 122, ... and 12N of the exemplary embodiment 1-1. That is, the font registering process and the character code determining process performed by the respective character-layer processing modules of the exemplary embodiment 1-1 are performed integrally in the unified-font processing module 1440. The processed results are sent back to the respective character-layer processing modules 1421, 1422, ..., and 142N.

The unified-font processing module 1440 may have a font code/character code correspondence table generating module. That is, although the exemplary embodiment 1-1 utilizes the character codes so that the character codes are equivalent to the font codes, the font codes are used as identifiers that identify the character images (including outlined data), and the font code/character code correspondence table between the font codes and the character codes, which is a result of character recognition, is generated. The font code/character code correspondence table is passed to the output-file generating module 1430. The output-file generating module 1430 generates an output file including the font code/character code correspondence table. With this configuration, an image processing apparatus that receives the output file extracts the font code corresponding to the character code in the font code/character code correspondence table, and generates character image from the font code to reproduce an image.

Furthermore, the unified-font processing module 1440 may have modules corresponding to the output-file generating modules 440, 650, 860 and 1260 of the exemplary embodiments 1-1-1 to 1-1-4. That is, this module 1440 may generate and pass each character-layer data to the output-file generating module 1430. In this case, the output-file generating module 1430 receives each character-layer data from the unified-font processing module 1440 to generate the output file 300, instead of receiving the character-layer data from the respective character-layer processing modules 1421, 1422, ... and 142N.

The character-layer processing modules 1421, 1422, and 142N are connected to the N-layer separating module 1410, the output-file generating module 1430 and the unified-font processing module 1440. These modules 1421, 1422, ... and 142N correspond to the character-layer processing modules 121, 122, ... and 12N of the exemplary embodiment 1-1, respectively. However, the font registering modules (the font registering modules 430, 640, 850 and 1250 of the exemplary embodiments 1-1-1 to 1-1-4) and the character-code determining modules (the character-code determining modules 420, 630, 830 and 1240 of the exemplary embodiments 1-1-1 to 1-1-4) are not provided in these modules 1421, 1422, ... and 142N. The font registering module and the character-code determining module are included in the unified-font processing module 1440 as described above.

An exemplary process according to the exemplary embodiment 1-2 will be described with reference to the flow chart shown in FIG. 2. The exemplary process according to the exemplary embodiment 1-2 is the same as the processes in Steps S200 to S206, and S210 to S214 in the flow chart shown in FIG. 2.

In Step S208, a process performed by the unified-font processing module 1440 is added. Specifically, the processes (the character clipping process, the representative character determining process, the magnifying process and the like) of the exemplary embodiments 1-1-1 to 1-1-4 are performed, and then the unified-font processing module 1440 integrally performs its process, which is an integration of the font registering process and the character code determining process in the respective character-layer processing modules.

<Exemplary Embodiment 1-3>

An exemplary embodiment 1-3 will now be described.

In the exemplary embodiments 1-1 and 1-2, the processes are performed for the N binary-image data while it is assumed that the presumption that the N binary-image data only include characters. However, depending on an input image or a process performed by the N-layer separating modules 110 and 1410, a binary image other than characters may be also included. In the exemplary embodiment 1-3, therefore, by further separating N binary-image data into character images and image data other than the character images and performing a proper process for the character images and the image data other than the character images, a processing load on the character-layer processing modules to process the character images is reduced and the information amount after the process is decreased.

Figure 15:
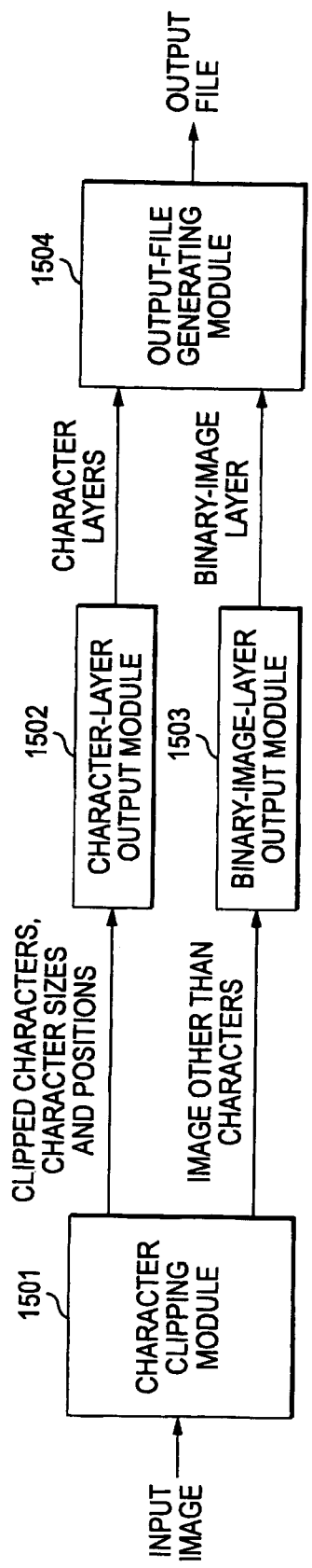
FIG. 15 is a module configuration diagram conceptually showing an exemplary configuration of a character-layer processing module according to an exemplary embodiment 1-3.

In the exemplary embodiment 1-3, the character-layer processing modules 121, 122, . . . 12N of the exemplary embodiment 1-1 and the character-layer processing modules 1421, 1422, . . . and 142N of the exemplary embodiments 1-2 are configured to have a module configuration shown in FIG. 15. In other words, the module configuration in FIG. 15 is incorporated as the character-layer processing module of the exemplary embodiment 1-1 or the exemplary embodiment 1-2.

The character-layer processing module according to the exemplary embodiment 1-3 includes a character clipping module 1501, a character-layer output module 1502, a binary-image-layer output module 1503 and an output-file generating module 1504, as shown in FIG. 15.

The character clipping module 1501 is connected to the character-layer output module 1502 and the binary-image-layer output module 1503. The character clipping module 1501 clips (extracts) character images (pixel block), which are images to be converted into vector information, from input image data and passes the clipped character images and their size and position to the character-layer output module 1502. Furthermore, the character clipping module 1501 passes images other than the character images to the binary-image-layer output module 1503.

Character recognition software or the like may be used to extract the character images. For example, an image of the small letter 'i' of the alphabet is a set of two connectivity pixel regions. For recognizing this character, it is necessary to combine plural connectivity pixel components. The character images may be extracted using character rectangles extracted by character recognition software. Portions other than the rectangles recognized as characters may be passed to the binary-image-layer output module 1503.

The character-layer output module 1502 is connected to the character clipping module 1501 and the output-file generating module 1504. The character-layer output module 1502 receives the character images clipped by the character clipping module 1501 and the size and position of the clipped character images, converts the character images into vector information, and generates data of a character layer that forms an output file. Then, the character-layer output module 1502 passes the data to the output-file generating module 1504.

The binary-image-layer output module 1503 is connected to the character clipping module 1501 and the output-file generating module 1504. The binary-image-layer output module 1503 receives the images other than the character images from the character clipping module 1501, and generates data of binary images that form the output file. This module 1503 passes the data to the output-file generating module 1504.

The binary-image-layer output module 1503 encodes, for example, the binary images and outputs encoded data of binary-image layers. The encoded data of the binary-image layers may be generated using a binary value compressing method such as CCITT G3, CCITT G4, JBIG, JBIG2, etc. Alternatively, other methods such as LZ and so on may be used for compression. Still alternatively, the data may be just uncompressed bit sequence.

The output-file generating module 1504 is connected to the character-layer output module 1502 and the binary-image-layer output module 1503. The output-file generating module 1504 receives the data of the character layer from the character-layer output module 1502 and the data of the binary images from the binary-image-layer output module 1503, and generates the output file.

Figure 18:
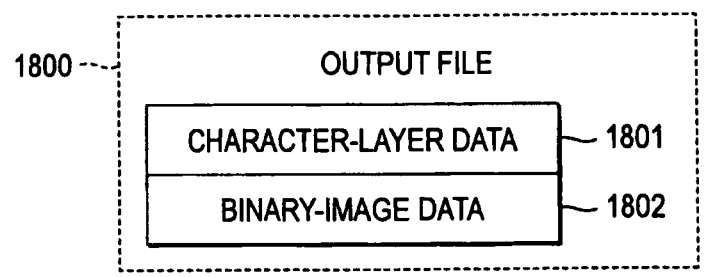
FIG. 18 is an explanatory diagram showing an example of a data structure of an output file.

A data structure of the output file is shown in FIG. 18. An output file 1800 includes character-layer data 1801 and binary-image data 1802. In the output file 1800, the character-layer data 1801 is vector information into which representative pixel blocks. Equivalent pixel blocks among the image data received by the character clipping module 1501 are brought together to generate each representative pixel block. In the output file 1800, the binary-image-layer data 1802 is data in the image data, which are not converted into the vector information.

As a format of the output file 1800, for example, PDF (Portable Document Format; registered trademark) may be used. It should be noted that although the PDF may be used, an example of the data structure of the character data 1801 and the binary-image-layer data 1802 have not yet been present as data contained in the PDF.

A system that receives the output file 1800 performs a rendering process for the character data 1801 in the output file 1800 and synthesizes the binary-image-layer data 1802, to generates images equivalent to the input images received by the image clipping module 1501. Moreover, the images equivalent to the input images may include more or less modified images as well as the images equivalent to the input images.

Figure 16:
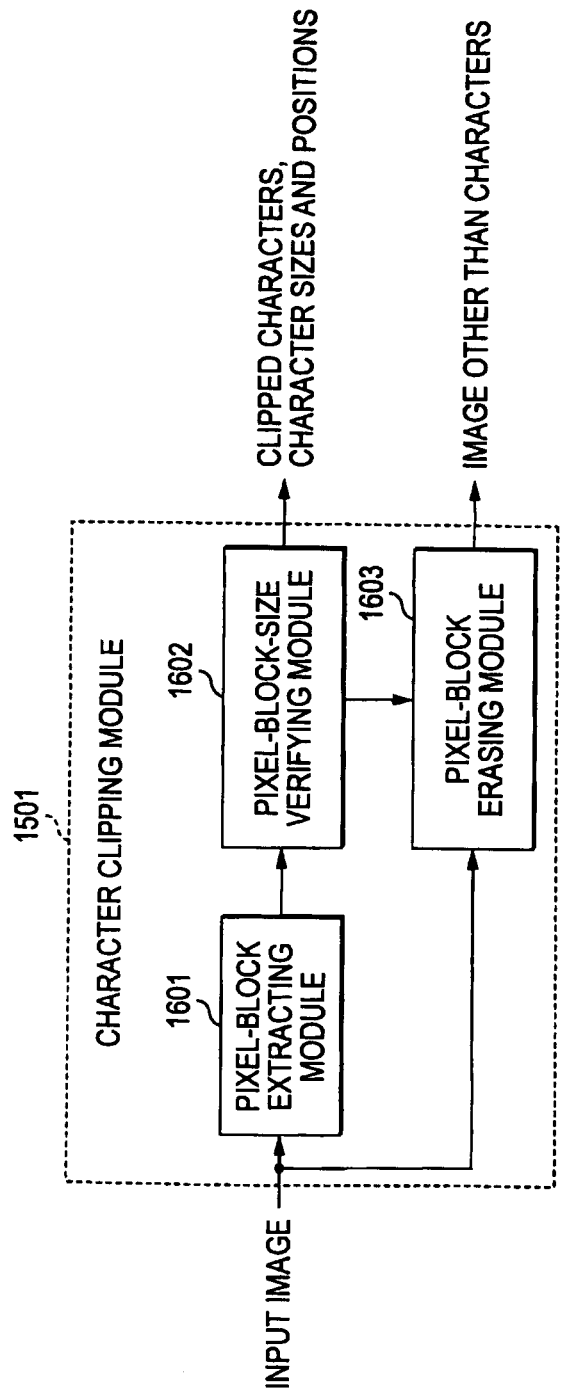
FIG. 16 is a module configuration diagram conceptually showing an exemplary configuration of a character clipping module.

FIG. 16 is a module configuration diagram conceptually showing an exemplary configuration of the character clipping module 1501 according to the exemplary embodiment 1-3 shown in FIG. 15.

The character clipping module 1501 includes a pixel-block extracting module 1601, a pixel-block-size verifying module 1602 and a pixel-block erasing module 1603.

The pixel-block extracting module 1601 is connected to the pixel-block-size verifying module 1602, and extracts pixel blocks from the input image. The pixel blocks and the extracting of the pixel blocks are the same as described above.

The pixel-block-size verifying module 1602 is connected to the pixel-block extracting module 1601 and the pixel-block erasing module 1603. The pixel-block-size verifying module 1602 verifies sizes of the pixel blocks. Specifically, the pixel-block-size verifying module 1602 divides pixel block into character images as images to be vectorized and images other than the character images and passes the character images and their size and position to the pixel-block erasing module 1603 and the character-layer output module 1502. For example, the following methods (1) to (3) may be used for verification of the sizes of the pixel blocks.

(1) If the number of black pixels in a pixel block is more than a threshold, it is determined to be a large mark such as a figure, not a character. As the threshold, a value such as 10,000 may be used, for example.

(2) If the number of black pixels in a pixel block is less than a threshold, it is determined to be a small mark such as a noise, not a character. As the threshold, a value such as 5 may be used, for example.

(3) Other pixel blocks are determined as character images. The pixel-block-size verifying module 1602 extracts the character images, their sizes (image sizes of the clipped characters), and their positions in the input images, and pass them to the pixel-block erasing module 1603 and the character-layer output module 1502.

Although it is determined, in the above-described example, as to whether a pixel block is a character or not based on the number of black pixels in the pixel block, other methods may be used.

For instance, a rectangle (a circumscribed rectangle) including a pixel block is extracted. Then, if one of width and length thereof is larger than a threshold, it may be determined to be other than a character. As the threshold, for example, a value such as 1,000 may be used.

For example, if both of the width and length of the rectangle are smaller than a threshold, it may be determined to be other than a character. As the threshold, for example, a value such as 3 may be used.

Furthermore, the large mark in the above-described example may not be determined to be other than a character.

Also, the small mark in the above-described example may not be determined to be other than a character.

The pixel-block erasing module 1603 is connected to the pixel-block-size verifying module 1602. The pixel-block erasing module 1603 erases a pixel block, which is determined to be a character image, from the input images. Specifically, this module 1603 receives the character images and their sizes and positions from the pixel-block-size verifying module 1602 and erases the character images, which are present in the respective positions, from the input images. This module 1603 passes the remaining images after the erasing of the character images to the binary-image-layer output module 1503 as the images other than the characters.

Figure 17:
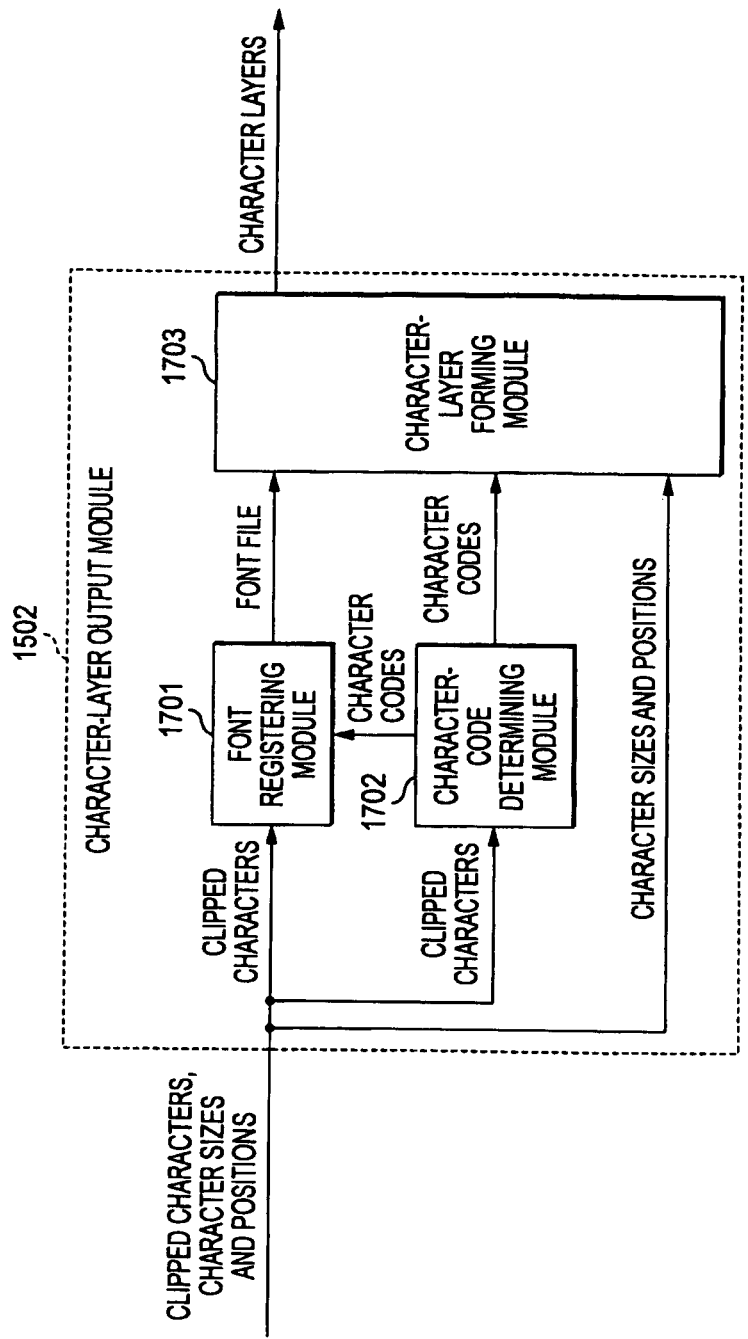
FIG. 17 is a module configuration diagram conceptually showing an exemplary configuration of a character-layer output module.

FIG. 17 is a module configuration diagram conceptually showing an exemplary configuration of the character-layer output module 1502 according to the exemplary embodiment 1-3 shown in FIG. 15. The character layer 1502 includes a font registering module 1701, a character-code determining module 1702 and a character-layer forming module 1703.

The character-code determining module 1702 is connected to the font registering module 1701 and the character-layer forming module 1703. The character-code determining module 1702 receives the clipped character images from the pixel-block-size verifying module 1602 of the character clipping module 1501, and assigns character codes to the received character images. This module 1702 passes the character codes to the font registering module 1701 and the character-layer forming module 1703.

Such assignment may be properly made such that an escape code and the like is not be assigned. The character codes may be assigned by performing character recognition, or a single code may be assigned. If the character codes are properly assigned, the clipped character images are not necessarily input to the character-code determining module 1702.

The font registering module 1701 is connected to the character-code determining module 1702 and the character-layer forming module 1703. The font registering module 1701 receives the clipped character images from the pixel-block-size verifying module 1602 of the character clipping module 1501 and the character codes corresponding to the character images from the character-code determining module 1702, generates a font file, and passes the font file to the character-layer forming module 1703.

In other words, the font registering module 1701 registers characters shapes, which correspond to the character codes assigned by the character-code determining module 1702, in a format of font file. As to a font, after outlining the character shapes, it may be registered as outline fonts, or it may be registered as bit map fonts in the form of a bit map.

The character-layer forming module 1703 is connected to the font registering module 1701 and the character-code determining module 1702. The character-layer forming module 1703 receives the font file from the font registering module 1701, the character codes from the character-code determining module 1702 and the sizes and positions of the characters from the pixel-block-size verifying module 1602 of the character clipping module 1501, generates the character-layer data 1801, and passes the data 1801 to the output-file generating module 1504.

The character-layer forming module 1703 brings the data in the font file format generated by the font registering module 1701, the character codes determined by the character-code determining module 1702, and the sizes and positions of the characters corresponding to the character codes into one file together. The sizes and the positions are not needed for the whole of the respective character codes. If the sizes and the positions can be relatively determined, only a required portion may be designated. For example, if a character size is not varied continuously, only one designation may be made initially. If Y coordinates is not varied, designation only for X coordinates may be made. If a font size is fixed, it is required to designate a size.

The character-layer forming module 1703 combines these data and outputs the combined data as the character-layer data 1801.

The registration of the character images as the outline fonts has been exemplified. However, firstly, the whole of the whole character images, which are binary images, may be outlined and then, the outline information may be handled as character layers.

With the above operation, the separating of the input image data into the character-layer data and the binary-image-layer data and the generating of the output file, which represents the input images using the character-layer data and the binary-image-layer data, have been described.

Figure 19:
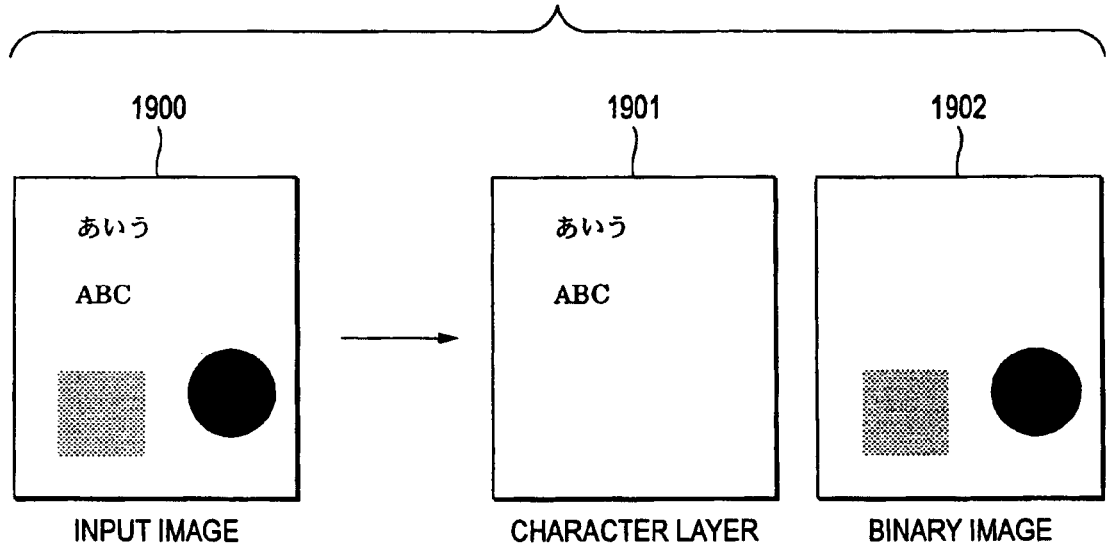
FIG. 19 is an explanatory diagram showing examples of character-layer data and binary-image-layer data.

An example of the character-layer data and the binary-image-layer data is shown in FIG. 19. In FIG. 19, some Japanese Hiragana characters are shown together with the alphabetic characters ('ABC'). Since those Japanese characters are shown just as an example of characters but don't have specific meaning here, they are not translated into English.

The character clipping module 1501 receives input image data 1900. The input image data 1900 is separated into a character image and an image other than the character image. The character-layer output module 1502 generates character-layer data 1901 and the binary layer image output module 1503 generates binary-image-layer data 1902.

That is, the character-layer data 1901 refers to only a portion of characters (character images) clipped from the input image data 1900. A binary-image layer refers to a small pixel blocks or a large pixel blocks clipped from the input image data 1900, which becomes the binary-image-layer data 1902 shown in FIG. 19. Additionally, although the character-layer data 1901 is an image which can be recognized as a character by a person in FIG. 19, the data 1901 is not necessarily such an image. Even pixel block impossible to understand may be clipped as a character.

A modified example of the exemplary embodiment 1-3 will now be described.

Figure 20:
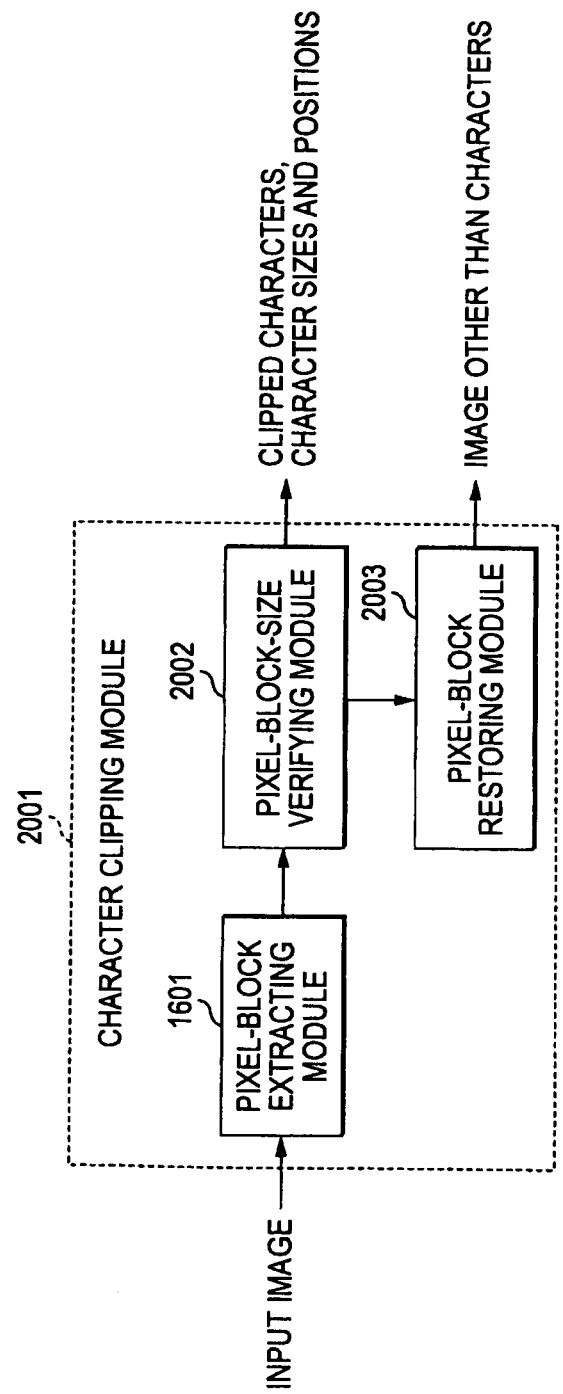
FIG. 20 is a module configuration diagram conceptually showing an exemplary configuration of a character clipping module according to a modified example of the exemplary embodiment 1-3.

FIG. 20 is a module configuration diagram conceptually showing an exemplary configuration of a character clipping module 2001 corresponding to the character clipping module 1501 of the exemplary embodiment 1-3.

The same elements as in the exemplary embodiment 1-3 are denoted by like reference numerals, and description thereon will be omitted.

The character clipping module 1501 (see FIG. 15) of the exemplary embodiment 1-3 erases portions, which are determined as character images, from the input image to clip images other than the character images. However, other methods may be used. Images other than character images may be generated by restoring (drawing) portions, which are determined as other than character images, in an image.

The modified example of the exemplary embodiment 1-3 employs the character clipping module 2001, which corresponds to the character clipping module 1501 of the exemplary embodiment 1-3, as shown in FIG. 20.

The character clipping module 2001 includes a pixel-block extracting module 1601, a pixel-block-size verifying module 2002 and a pixel-block restoring module 2003.

The pixel-block-size verifying module 2002 is connected to the pixel-block extracting module 1601 and the pixel-block erasing module 2003. The pixel-block-size verifying module 2002 verifies sizes of pixel blocks. Specifically, this module 2002 separates pixel block into character images as images to be vectorized and images other than the character images, passes the character images and their sizes and positions to the character-layer output module 1502, and passes the images other than the character images and their sizes and positions to the pixel-block restoring module 2003. A method for verifying sizes of pixel blocks is the same as in the pixel-block-size verifying module 1602 of the exemplary embodiment 1-3.

The pixel-block restoring module 2003 is connected to the pixel-block-size verifying module 2002, and generates images other than characters using the image other than the character images and their sizes and positions, which are received from the pixel-block-size verifying module 2002, and passes the generated images to the binary-image-layer output module 1503.

Figure 21:
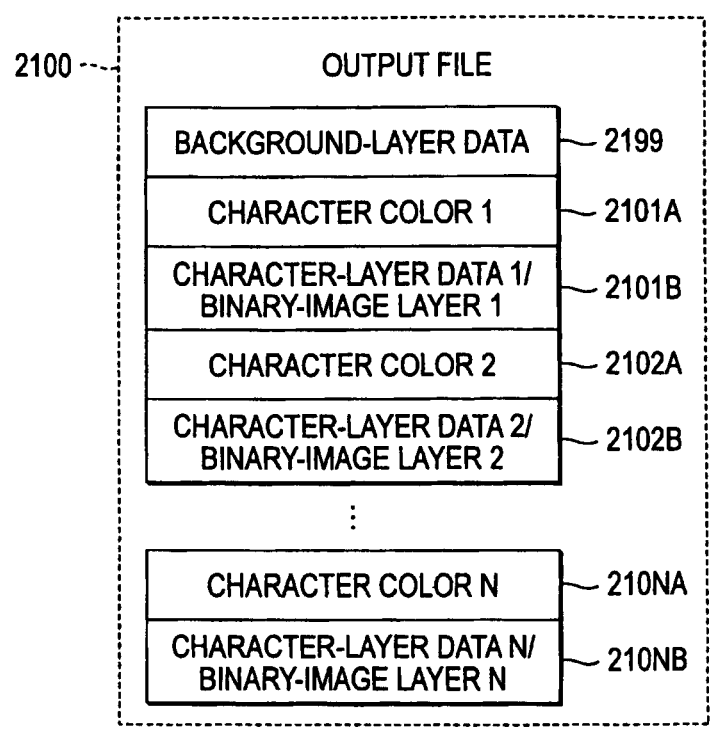
FIG. 21 is an explanatory diagram showing an example of a data structure of an output file according to the exemplary embodiment 1-3.

Herein, an example of a data structure of an output file according to the exemplary embodiment 1-3 (including its modification) will be described with reference to FIG. 21.

An output file 2100 includes N character-layer data/binary-image layers, N pieces of corresponding color information, and background data that is a multilevel image. Specifically, the output file 2100 includes a background-layer data 2199, a character color 1 2101A, a character-layer data 1/binary-image layer 1 2101B, a character color 2 2102A, a character-layer data 2/binary-image layer 2 2102B, . . . , a character color N 210NA, and a character-layer data N/binary-image layer N 210NB.

Figure 3:
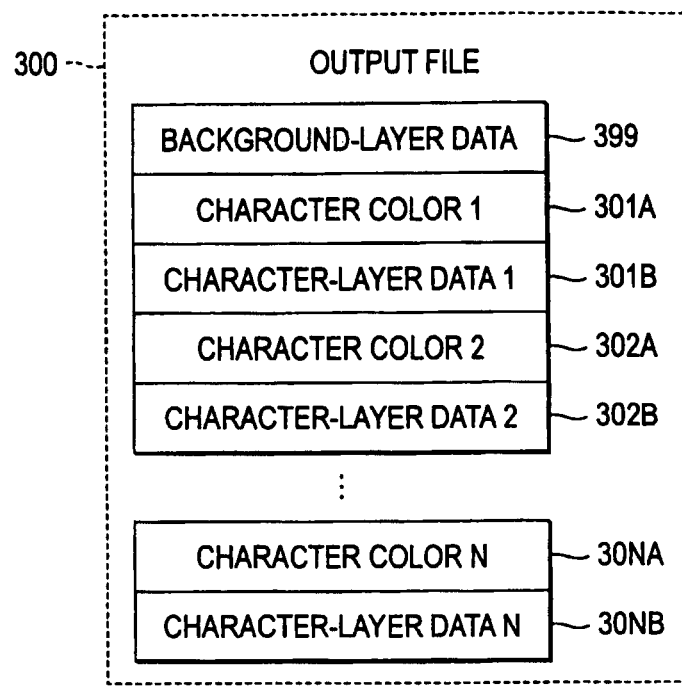
FIG. 3 is an explanatory diagram showing an example of a data structure of an output file.

Except that the character color 1 2101A, the character color 2 2102A, . . . and the character color N 210NA have the character-layer data and binary-image layers, the output file 2100 is the same as the output file 300 of the exemplary embodiment 1-1 or the exemplary embodiment 1-2 shown in FIG. 3.

<Exemplary Embodiment 2>

In an exemplary embodiment 2, an input image is separated into three layers, that is, a foreground image, a background image and selection information (also referred to as a selection layer). The separating herein may be made using the technique disclosed in JP 2000-196893 A (corresponding to US 2001/0000710 A and US 2001/0000711 A).

In the technique disclosed in JP 2000-196893 A (corresponding to US 2001/0000710 A and US 2001/0000711 A), the selection information is binary-value information composed of values of 0 and 1. Using the selection information, either the foreground image or the background image is selected in units of pixels.

The exemplary embodiment 2 uses the selection information in a manner different from the manner in which JP 2000-196893 A (corresponding to US 2001/0000710 A and US 2001/0000711 A) uses the selection information.

In other words, in the exemplary embodiment 2, the selection information (binary-image information) is first outlined. An outlining operation is performed according to a typical outlining method. That is, the outlining operation is performed by separating black pixels (or white pixels) of an input binary image into connectivity components, and representing peripheries of the respective connectivity components as a straight line or a curve.

The selection information is used as clip information of the foreground image. That is, in generating an image, the foreground image, the background image and the selection information, which are the output file processed in the exemplary embodiment 2, are used to perform a drawing operation in the following order.

(1) Draw the background image.
(2) Generate an image by clipping the foreground image using the outline, which is the selection information.
(3) Overwriting the clipped image on the background image.

With such drawing, it is possible to represent an image equally to the technique disclosed in JP 2000-196893 A (corresponding to US 2001/0000710 A and US 2001/0000711 A), using the outlined selection information. Since the selection information is outlined, the foreground image can be selected at a higher precision than the units of pixels.

In this case, if the selection information is a shape of an outlined character and the foreground image is an area which includes the character and which is painted out with a color of the character, images with different colors for respective characters are represented.

Figure 22:
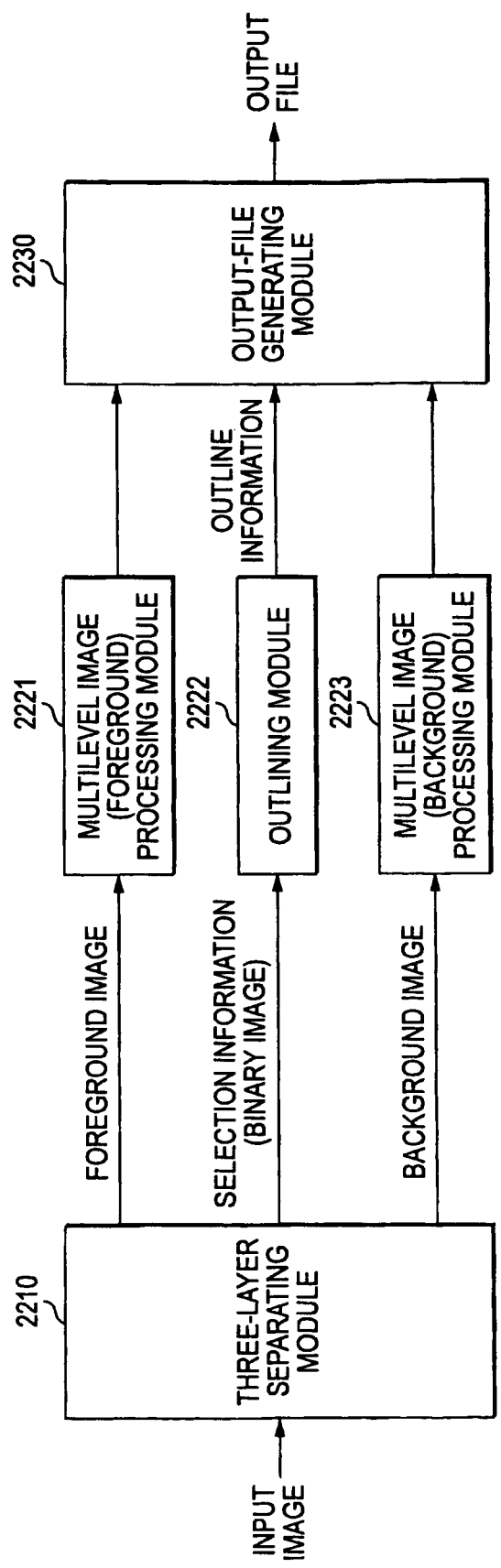
FIG. 22 is a module configuration diagram conceptually showing an exemplary configuration of an exemplary embodiment 2.

FIG. 22 is a module configuration diagram conceptually showing an exemplary configuration of the exemplary embodiment 2.

The exemplary embodiment 2 is configured to include a three-layer separating module 2210, a multilevel image (foreground) processing module 2221, an outlining module 2222, a multilevel image (background) processing module 2223 and an output-file generating module 2230.

The three-layer separating module 2210 is connected to the multilevel image (foreground) processing module 2221, the outlining module 2222 and the multilevel image (background) processing module 2223. The three-layer separating module 2210 separates an input multilevel image into a multilevel foreground image, selection information (binary image) and a multilevel background image. For example, the technique disclosed in JP 2000-196893 A (corresponding to US 2001/0000710 A and US 2001/0000711 A) may be used for such separating process. The multilevel foreground image includes a character image. The selection information is a binary image used to clip the multilevel foreground image.

The multilevel image (foreground) processing module 2221 is connected to the three-layer separating module 2210 and the output-file generating module 2230. The multilevel image (foreground) processing module 2221 receives the multilevel foreground image from the three-layer separating module 2210, performs a multilevel image encoding, such as JPEG, for the received multilevel foreground image, and passes its result to the output-file generating module 2230.

The multilevel image (background) processing module 2223 is connected to the three-layer separating module 2210 and the output-file generating module 2230. The multilevel image (background) processing module 2223 receives the multilevel background image from the three-layer separating module 2210, performs a multilevel image encoding, such as JPEG, for the received multilevel background image, and passes its result to the output-file generating module 2230.

The multilevel image encoding may not be performed by the multilevel image (foreground) processing module 2221 or the multilevel image (background) processing module 2223.

The outlining module 2222 is connected to the three-layer separating module 2210 and the output-file generating module 2230. The outlining module 2222 receives the selection information from the three-layer separating module 2210. The selection information is a binary image and is outlined by the outlining module 2222.

The selection information may be outlined in a technique similar to the generation of the character-layer data by the character-layer processing module of the exemplary embodiment 1, for example. That is, this technique is a technique for registering as a font, and creates a font file as an outline font and further specifies which font is to be used, using a character code. A font filer a character code, a character size (a font size), and a character position are described in the outline data. Alternatively, various drawing commands may be used as outline data (including an outline font). That is, a closed area of a character image is described using a command describing a straight line, a command describing a Bezier curve, a command describing a rectangle, etc. There are other available outlining methods. For example, a method of approximating a contour of a binary image to a straight line or a curve to generate a closed area may be used. Also, the outline font describes a closed area.

As a method for clipping the multilevel foreground image using the outline data, for example, there is a process of filling a closed area with a multilevel foreground image corresponding to the closed area, or a process generally called a clip process.

The outlining module 2222 may include the character layer modules of the exemplary embodiment 1.

The output-file generating module 2230 is connected to the multilevel image (foreground) processing module 2221, the outlining module 2222 and the multilevel image (background) processing module 2223. The output-file generating module 2230 receives the multilevel foreground image (which may be encoded or not) from the multilevel image (foreground) processing module 2221, the selection information from the outlining module 2222, and the multilevel background image (which may be encoded or not) from the multilevel image (background) processing module 2223, and generates an output file.

Figure 23:
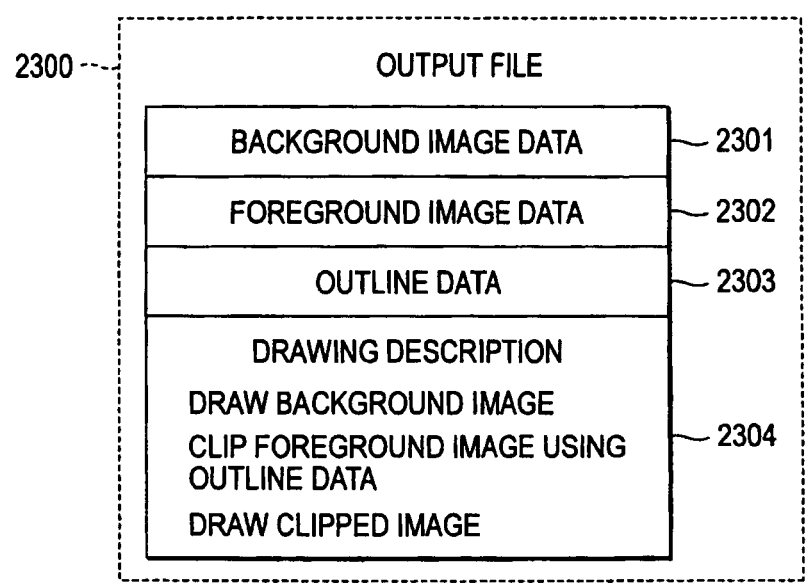
FIG. 23 is an explanatory diagram showing an example of a data structure of an output file.

An example of a data structure of an output file 2300 will be now described with reference to FIG. 23.

The output file 2300 includes background image data 2301, foreground image data 2302, outline data 2303, and drawing description 2304. The background image data 2301 is the multilevel background images from the multilevel images (background) processing module 2223. The foreground image data 2302 is the multilevel foreground image from the multilevel images (foreground) processing module 2221. The outline data 2303 is the selection information from the outlining module 2222. The drawing description 2304 describes the following information ((1) to (3)):

(1) A command to draw background images
(2) A command to clip foreground images using outline data which is the selection information
(3) A command to overwrite the clipped foreground images on the background images <Exemplary Embodiment 3>

An outline of an exemplary embodiment 3 (including exemplary embodiments 3-1 to 3-3) will be described.

The exemplary embodiment 3 is configured to obtain a character color for each character and add color information to each character.

First, character/line drawing information (binary image) is obtained from an input image (multilevel image). The character/line drawing information corresponds to the selection information in the exemplary embodiment 2 and, hereinafter, is also referred to as selection information.

Subsequently, the character/line drawing information is separated for each character. A character color is obtained for each character.

As a method for obtaining a color, there are two methods described below.

(First Method)

An input image is separated into N layers for each color as in the N-layer separating module 110 of the exemplary embodiment 1 as described above. Pixels of the respective layers present in an area of each character are detected. If the number of layers in which the detected pixels are black (that is, the pixel constitutes a character) is one, color information of the layer is adopted. If plural layers are present, a mean value of color information of the layers is obtained as a color, for example. This method will be described in more detail in the exemplary embodiment 3-1.

(Second Method)

Pixels in an input image, which correspond to an area of each character, are extracted. Then, a mean value of the pixel values of the input image in the area is obtained. The mean value becomes color information for the character. This method will be described in more detail in the exemplary embodiment 3-2.

The color information of the characters obtained using the first method or the second method are described in an output file.

Characters are outlined and described. The characters may be outlined in a technique similar to the generating of the character-layer data by the character-layer processing module of the exemplary embodiment 1, for example.

However, if, in the first method, plural colors of the layers which are present in a character area are extremely different or if, in the second method, a variance of pixel values is extremely large, the above-described methods are not used as they are. This is because obtaining just a mean value has a risk of color mixing. In order to avoid such a problem, the following solutions may be adopted: that is, (1) including the character image in the multilevel background image without outlining the character image, and (2) clipping the character image as in the second exemplary embodiment and referring to colors of the multilevel foreground images.

Each character area may be a character rectangle including a character image, or be a pixel block itself, which is a character image.

<Exemplary Embodiment 3-1>

Figure 24:
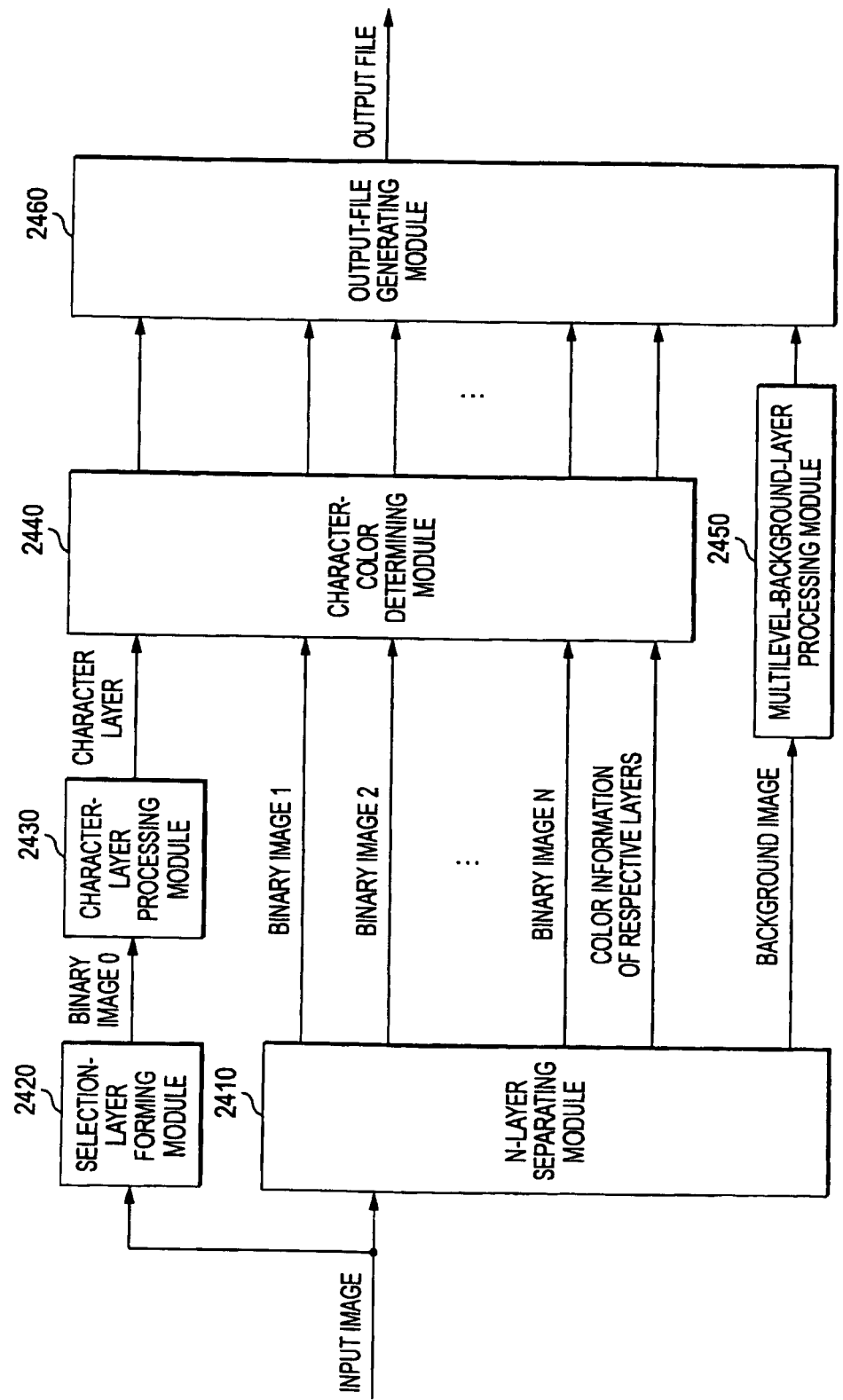
FIG. 24 is a module configuration diagram conceptually showing an exemplary configuration of an exemplary embodiment 3-1.

FIG. 24 is a module configuration diagram conceptually showing an exemplary configuration of an exemplary embodiment 3-1.

The exemplary embodiment 3-1 is configured to include an N-layer separating module 2410, a selection-layer forming module 2420, a character-layer processing module 2430, a character-color determining module 2440, a multilevel-background-layer processing module 2450 and an output-file generating module 2460.

The N-layer separating module 2410 is connected to the character-color determining module 2440 and a multilevel-background-layer processing module 2450. The N-layer separating module 2410 is equivalent with the N-layer separating module 110 of the exemplary embodiment 1-1. That is, this module 2410 extracts a binary image of a foreground image for each color and the color information from an input multilevel image and passes them to the character-color determining module 2440. Also, this module 2410 extracts a multilevel background image and passes it to the multilevel-background-layer processing module 2450.

The selection-layer forming module 2420 is connected to the character-layer processing module 2430. The selection-layer forming module 2420 extracts a foreground image (character/line drawing information) in the input multilevel image, converts it into a binary image and passing the binary image to the character-layer processing module 2430. In other words, this module 2420 forms selection information and passes it to the character-layer processing module 2430. The selection information may be formed using the method disclosed in JP 2000-196893 A (corresponding to US 2001/0000710 A and US 2001/0000711 A). The selection information may be formed by performing an OR operation for the N binary images (the binary images for the respective colors) extracted by the N-layer separating module 2410.

The character-layer processing module 2430 is connected to the selection-layer forming module 2420 and the character-color determining module 2440. The character-layer processing module 2430 receives and vectorizes the selection information from the selection-layer forming module 2420 to generate vector information, and passes the vector information to the character-layer forming module 2440 as character-layer data. This module 2430 performs the same process as the outlining module 2222 of the exemplary embodiment 2. That is, this module 2430 generates the outline information for each character image (each closed area) and registers it as a font.

The character-color determining module 2440 is connected to the N-layer separating module 2410, the character-layer processing module 2430 and the output-file generating module 2460. The character-color determining module 2440 determines color information of each vector information based on a color for the binary image which is extracted by the N-layer separating module 2410 and corresponds to each vector information generated by the character-layer processing module 2430. In other words, the character-color determining module 2440 adds the color information to the outline information for each character image. This module 2440 passes the outline information to which the color information is added, to the output-file generating module 2460. The character-color determining module 2440 may include the character layer modules of the exemplary embodiment 1.

The multilevel-background-layer processing module 2450 is connected to the N-layer separating module 2410 and the output-file generating module 2460. The multilevel-background-layer processing module 2450 performs the same function as the multilevel-background-layer processing module 129 of the exemplary embodiment 1-1.

The output-file generating module 2460 is connected to the character-color determining module 2440 and the multilevel-background-layer processing module 2450. The output-file generating module 2460 generates a file which has the multilevel background image encoded by the multilevel-background-layer processing module 2450 and the outline information to which the color information is added by the character-color determining module 2440.

A process according to the exemplary embodiment 3-1 will be now described with reference to FIGS. 25 to 28.

Figure 25:
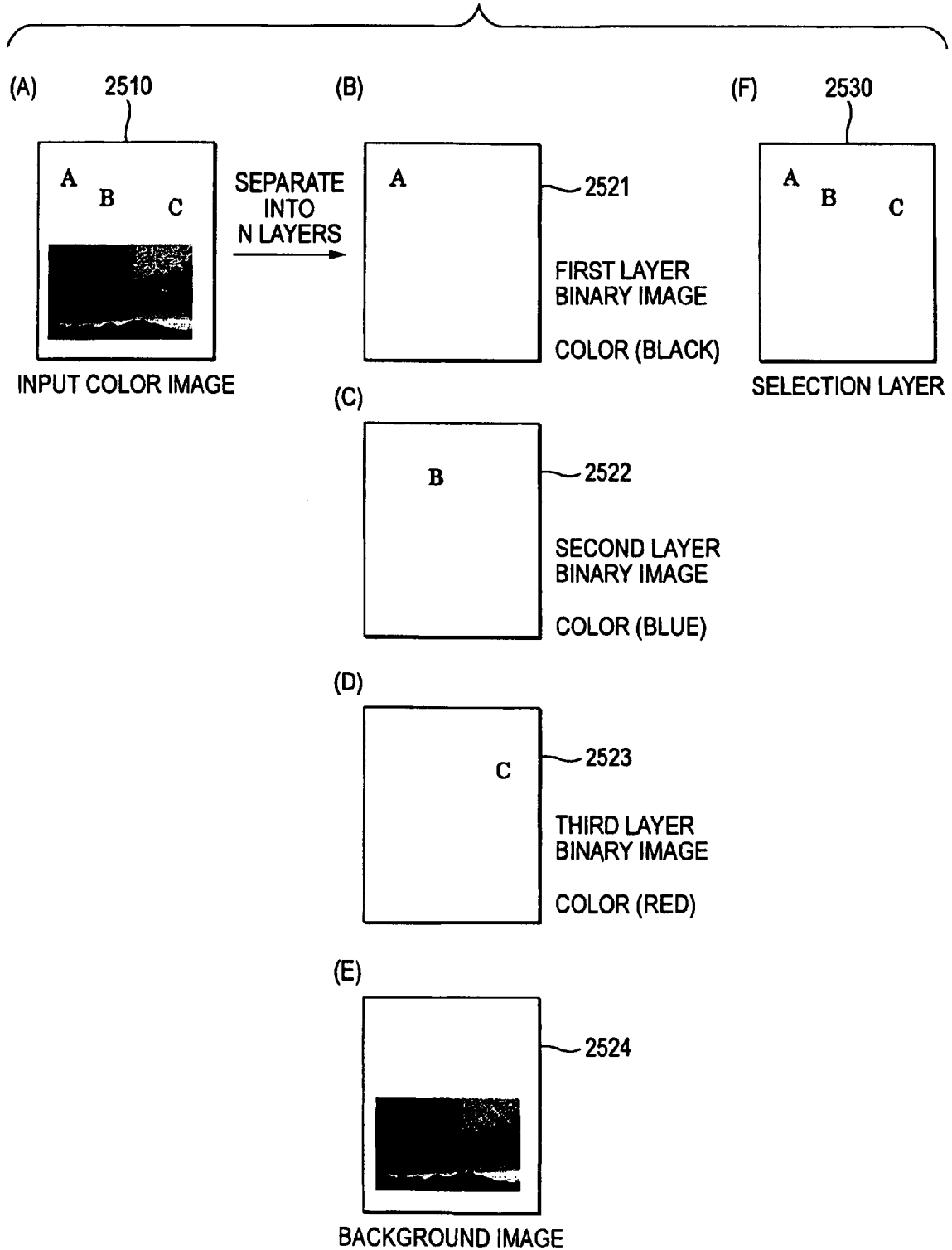
FIG. 25 is an explanatory diagram showing an example of an N-layer separating module and a selection layer.

FIG. 25 is an explanatory diagram showing an example of N-layer separating images and a selection layer.

The N-layer separating module 2410 separates an input color image 2510 into a background image and a foreground image and separates the foreground image into N (three in FIG. 25) layers for respective colors. In the input color image 2510 shown in FIG. 25A, it is assumed that a color of the character "A" is black, that a color of the character "B" is blue and that a color of the character "C" is red. That is, the input color image 2510 is separated into a first layer binary image 2521, a second layer binary image 2522, a third layer binary image 2523 and a background image 2524 by the N-layer separating module 2410.

The selection-layer forming module 2420 extracts a selection layer 2530 from the input color image 2510, that is, extracts an image (including the characters "A", "B" and "C" other than the background image) from the input color image 2510. The selection layer 2530 is a binary image as well.

Figure 26:
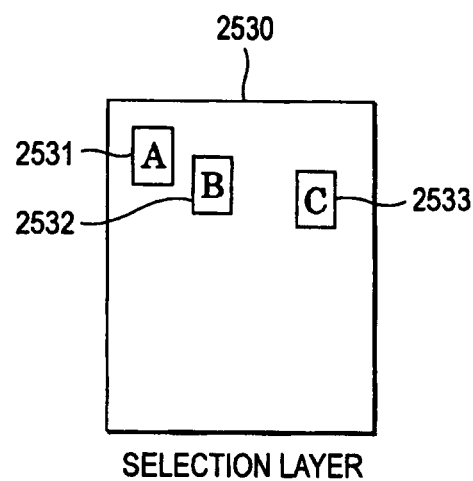
FIG. 26 is an explanatory diagram showing an example of a selection layer.

FIG. 26 is an explanatory diagram showing an example of the selection layer.

The character-layer processing module 2430 outlines a character 2531, a character 2532 and a character 2533 in the selection layer 2530, and assigns character codes to the respective characters for registration as fonts.

Then, the character-color determining module 2440 determines a color of each character. The case where a color for "B", that is, the character 2532 is determined in FIG. 26 will be described as an example.

Pixels which are present in the same positions as black pixels constituting the character "B" of the character 2532 are extracted from the three binary images (the first layer binary image 2521, the second layer binary image 2522 and the third layer binary image 2523) shown in FIG. 25. If the extracted pixels are black (i.e., the character in question is present in the binary image of the layer in question), a color for the character in question is determined as a color for the binary image of the layer in question. In this case, it is the second layer binary image 2522 that pixels are present in the same positions as the black pixels forming the character "B" of the character 2532. Since a color of the second layer binary image 2522 is blue, a color of the character "B" of the character 2532 is determined as blue. However, in this case, it is assumed that only a binary image of one layer at maximum corresponds to a position of one pixel.

However, the above-described method for determining a character color sometimes may not determine the character color as one color. This is because pixels in the character may correspond to binary images of plural layers. For example, if a character has a mixed color, the character may be separated into two layers by the N-layer separating module 2410.

Therefore, a character color may be determined as follows:
(1) If all pixels which are present in the same positions as black pixels forming a character correspond to a binary image of one layer (i.e., the number of colors of a character is 1), processes (1-1) and (1-2) are performed.
   (1-1) Adopt a color of the binary image of the one layer.
   (1-2) Erase the pixels from pixels of binary images of is corresponding layers.
(2) If pixels which are present in the same positions as black pixels forming a character correspond to binary images of plural layers (i.e., the number of colors of a character is more than one), processes (2-1) or (2-2) is performed.

(2-1) Perform processes (2-1-1) and (2-1-2) if all colors are similar to each other.
- (2-1-1) Adopt a mean value of the colors as a character color, or adopt a color having the largest area.
- (2-1-2) Erase the pixels from pixels of binary images of corresponding layers.

(2-2) Perform processes (2-2-1) to (2-2-3) if the colors are not similar (i.e., if colors having a large color difference therebetween are present).
- (2-2-1) Adopt a color having the largest area as a color of the character.
- (2-2-2) Erase the pixels from pixels of binary images of corresponding layers.
- (2-2-3) Do not adopt the pixels having a large color difference as pixels forming the character. Also, do not erase the pixels from pixels of binary images of corresponding layers.

By such processes, pixels which are adopted as the color of the character are erased from the binary image of the layer in question. Also, pixels not adopted as the color of the character remain in the binary image of the layer in question.

Also, whether or not colors are similar is determined as follow.
(1) Calculate an average color of colors of respective pixels.
(2) Calculate color differences between colors of the respective pixels and the average color.
(3) If the color differences are equal to or less than a threshold value, determine that all of the colors are similar to each other.

Figure 27:
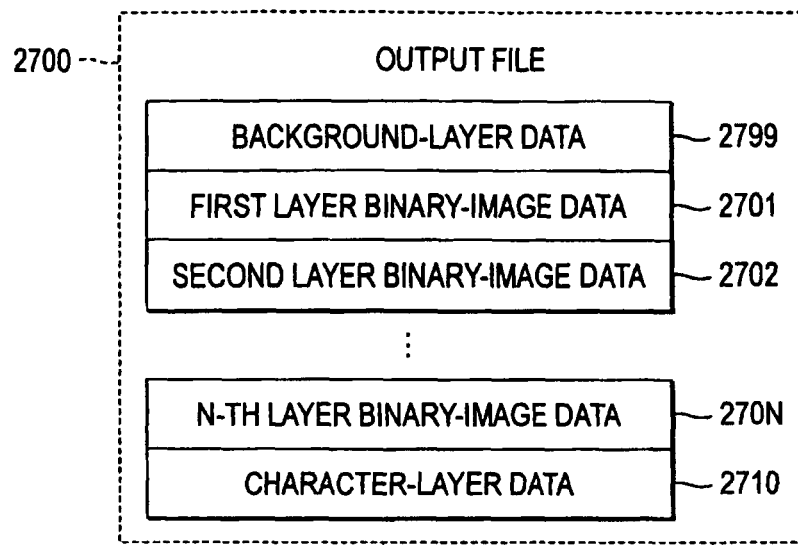
FIG. 27 is an explanatory diagram showing an example of a data structure of an output file.

FIG. 27 is an explanatory diagram showing an example of a data structure of an output file 2700 generated by the output-file generating module 2460.

The output file 2700 includes background-layer data 2799, binary-image data of a first layer to an N-th layer (a first layer binary-image data 2701, a second layer binary-image data 2702, ... an N-th layer binary-image data 270N), and character-layer data 2710. Also, the binary-image data of the respective layers may be compressed by the output-file generating module 2460 for output of the compressed data.

The character-layer data 2710 includes information to designate a color of each character. The character-layer data 2710 is generated by adding the data to designate a character color of each character to the information formed by the character-layer processing module 121, 122 and 12N of the exemplary embodiment 1-1.

For example, the character-layer data 2710 includes a character-layer-data table 2800 shown in FIG. 28. The character-layer-data table 2800 has a character code column 2801, a character size column 2802, a character position X column 2803, a character position Y column 2804 and a character color column 2805. In addition to this information, the character-layer data 2710 has a font file in which correspondence between character codes and charters shapes (outline fonts) are described.

In the above-described exemplary embodiment 3-1, if a color having a large color difference with respect to compared pixels, a color having the largest area is adopted. However, another method may be used.

For example, pixels constituting a character may not be adopted as a character if a color having a large color difference is present. In this case, the entire area of the character is returned to a background image. Alternatively, all of the pixels may not be erased from the binary image of the layer.

Also, in the above-described exemplary embodiment 3-1, after performing a character layer process by the character-layer processing module 2430, a character color is determined by the character-color determining module 2440. However, it is not necessary to comply with this order. In a step of performing a character clipping for a binary image which is selection information, a character color may be determined.

Moreover, in the exemplary embodiment 3-1, the background image is generated by the N-layer separating module 2410. However, if the pixels are returned to the background image because of the presence of pixels which are not erased by the binary images of the respective layers (that is, if a color character is not determined), the generation of the background image may be performed after determining the character color.

<Exemplary Embodiment 3-2>

Figure 29:
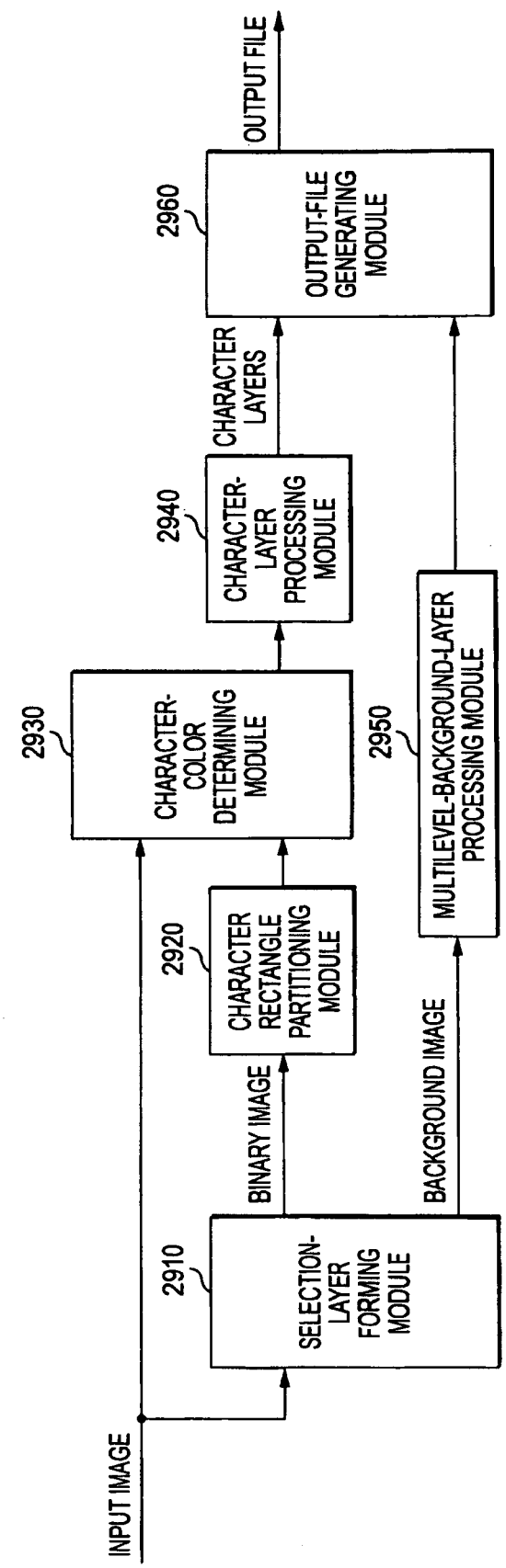
FIG. 29 is a module configuration diagram conceptually showing an exemplary configuration of an exemplary embodiment 3-2.

FIG. 29 is a module configuration diagram conceptually showing an exemplary configuration of the exemplary embodiment 3-2.

Although the exemplary embodiment 3-1 determines each character color based on a correspondence with binary images of N layers, the exemplary embodiment 3-2 determines each character color based on a correspondence with an input multilevel image.

The exemplary embodiment 3-2 is configured to include a selection-layer forming module 2910, a character rectangle partitioning module 2920, a character-color determining module 2930, a character-layer processing module 2940, a multilevel-background-layer processing module 2950 and an output-file generating module 2960.

The selection-layer forming module 2910 is connected to the character rectangle partitioning module 2920 and the multilevel-background-layer processing module 2950. The selection-layer forming module 2910 forms selection information (binary image) and a multilevel background image from an input image. This formation method may be, for example, one disclosed in JP 2000-196893 A (corresponding to US 2001/0000710 A and US 2001/0000711 A). The formation method disclosed in JP 2000-196893 A (corresponding to US 2001/0000710 A and US 2001/0000711 A) also forms a foreground image. This exemplary embodiment, however, need not form the foreground image. The selection-layer forming module 2910 passes the formed selection information to the character rectangle partitioning module 2920, and the background image to the multilevel-background-layer processing module 2950.

The character rectangle partitioning module 2920 is connected to the selection-layer forming module 2910 and the character-color determining module 2930. The character rectangle partitioning module 2920 partitions black pixels of the selection information (binary image) formed by the selection-layer forming module 2910, into character rectangles for generating outline fonts which are vector information. The character rectangle partitioning module 2920 passes the outline fonts to the character-color determining module 2930. The black pixels of the selection information are partitioned into a character rectangle for each outline font in a closed area. For example, the partitioning method may be the same as that of the outlining module 2222 of the exemplary embodiment 2.

The character-color determining module 2930 is connected to the character rectangle partitioning module 2920 and the character-layer processing module 2940. The character-color determining module 2930 determines, based on colors of the input image corresponding to the outline fonts from the character rectangle partitioning module 2920, color information of the outline fonts. This module 2930 passes its determination result to the character-layer processing module 2940.

The character-layer processing module 2940 is connected to the character-color determining module 2930 and the output-file generating module 2960. The character-layer processing module 2940 receives the outline fonts to which color information is added, from the character-color determining module 2930 so as to generate character-layer data. The character data are the same as that in the exemplary embodiment 1 or exemplary embodiment 2. Furthermore, the character-layer processing module 2940 may include the character layer module of the exemplary embodiment 1.

The multilevel-background-layer processing module 2950 is connected to the selection-layer forming module 2910 and the output-file generating module 2960. The multilevel-background-layer processing module 2950 encodes the multilevel image, which is a background image, from the selection-layer forming module 2910. The multilevel-background-layer processing module 2950 passes the encoded data to the output-tile generating module 2960.

The output-file generating module 2960 is connected to the character-layer processing module 2940 and the multilevel-background-layer processing module 2950. The output-file generating module 2960 generates an output file which has (i) the background image encoded by the multilevel-background-layer processing module 2950, (ii) the outline fonts generated by the character-layer processing module 2940, and (iii) the color information corresponding to the outline fonts.

A process according to the exemplary embodiment 3-2 will be described with reference to FIGS. 30 and 31.

Figure 30:
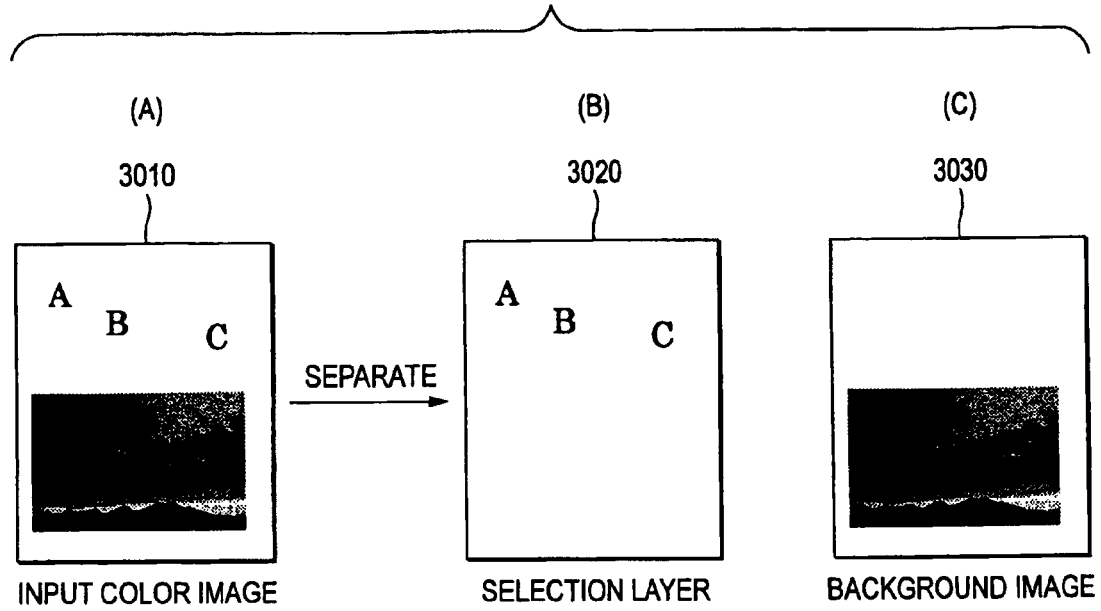
FIG. 30 is an explanatory diagram showing examples of an input color image, a selection layer and a background image.

FIG. 30 is an explanatory diagram showing examples of an input color image 3010, a selection layer 3020 and a background image 3030.

The input color image 3010 is separated into the selection layer 3020 and the background layer 3030 by the selection-layer forming module 2910. Respective characters in the selection layer 3020 are partitioned by the character rectangle partitioning module 2920. Since the selection layer 3020 is a binary image, the characters "A", "B" and "C" in the selection layer 3020 do not have color information. Therefore, the character-color determining module 2930 determines a character color for each character.

For example, in determining a color of the character "A", first, pixel values in positions of black pixels which constitute the character "A" in the selection layer 3020 are extracted from the input color image 3010. Since the black pixels constituting the character "A" are plural, plural color pixels are extracted. The character-color determining module 2930 calculates an average color of the plural color pixels and determines the average color as a character color.

After determining the character color, a character layer process is performed by the character-layer processing module 2940.

Then, the output-file generating module 2960 generates the output file 3100 using the character-layer data and the background image.

Figure 31:
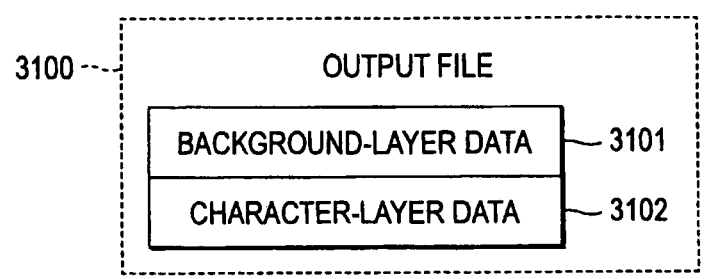
FIG. 31 is an explanatory diagram showing an example of a data structure of an output file.

FIG. 31 is an explanatory diagram showing an example of a data structure of the output file 3100.

The output file 3100 has background-layer data 3101 and character-layer data 3102. The background-layer data 3101 and the character-layer data 3102 are the same as those in the exemplary embodiment 3-1.

<Modified Example 1 of Exemplary Embodiment 3-2>

A modified example 1 of the exemplary embodiment 3-2 enables the character-color determining module 2930 of the exemplary embodiment 3-2 to judge as to whether or not pixel values in a character are similar, like the exemplary embodiment 3-1. That is, the character-color determining module 2930 may make a determination using color differences of the pixel values in the character and a variance of the color differences as follows. For example, if the variance is larger than a threshold, the character-color determining module 2930 may determine that the pixel values in the character are not similar.

If the character-color determining module 2930 determines that the pixel values in the character are not similar, an image of a black-pixel area of the character is returned to the background image. In this case, the black-pixel area of the character is erased from the selection information.

In the exemplary embodiment 3-2, the background image is formed by the selection-layer forming module 2910 before the character color is determined by the character-color determining module 2930. Thus, the above-described process cannot be performed. In order to return the image of the black-pixel are in the character to the background image, the modified example 1 of the exemplary embodiment 3-2 forms the background image using the selection information after the character color is determined.

Figure 32:
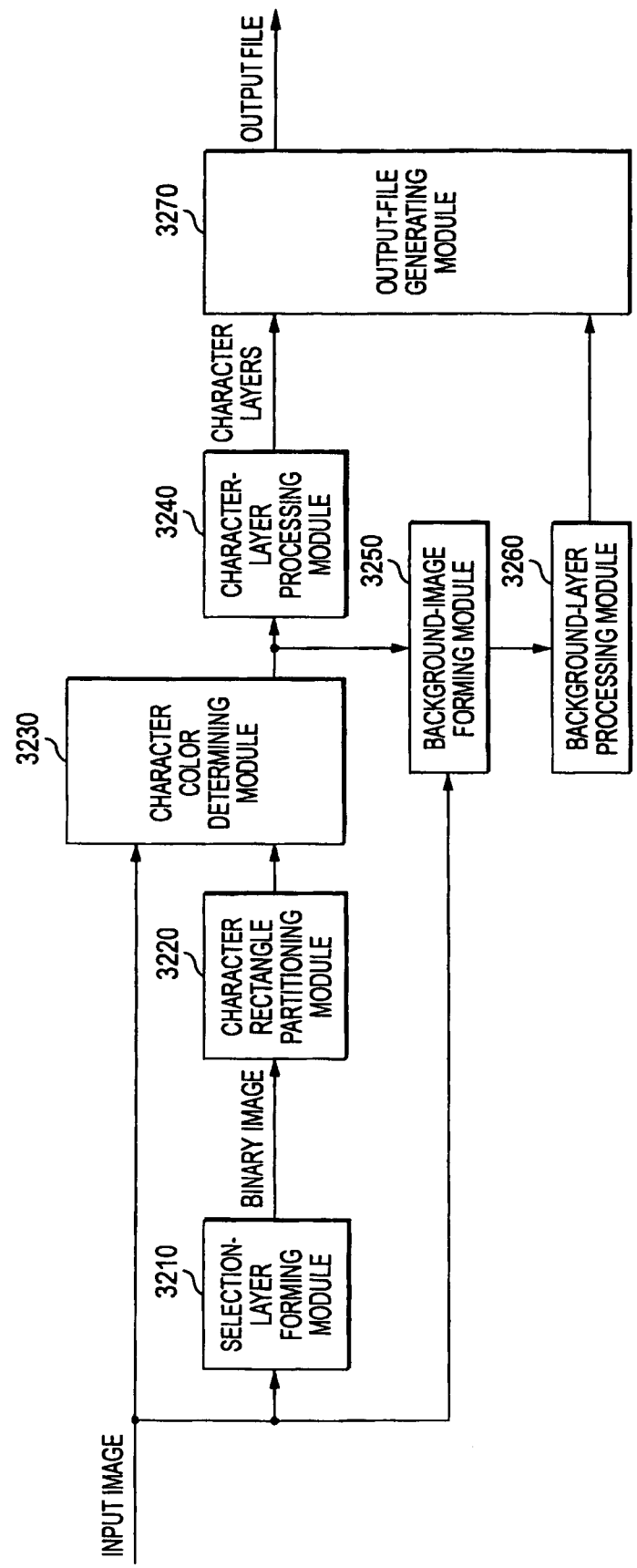
FIG. 32 is a module configuration diagram conceptually showing an exemplary configuration of a modified example 1 of the exemplary embodiment 3-2.

FIG. 32 is a module configuration diagram conceptually showing an exemplary configuration of the modified example 1 of the exemplary embodiment 3-2.

The modified example 1 of the exemplary embodiment 3-2 is configured to include a selection-layer forming module 3210, a character rectangle partitioning module 3220, a character-color determining module 3230, a character-layer processing module 3240, a background-image forming module 3250, a background-layer processing module 3260 and an output-file generating module 3270. The selection-layer forming module 3210 corresponds to the selection-layer forming module 2910, the character rectangle partitioning module 3220 to the character rectangle partitioning module 2920, the character-color determining module 3230 to the character-color determining module 2930, the character-layer processing module 3240 to the character-layer processing module 2940, the background-layer processing module 3260 to the multilevel-background-layer processing module 2950, and the output-file generating module 3270 to the output-file generating module 2960.

The selection-layer forming module 3210 forms only selection information which is a binary image.

The character-color determining module 3230 judges as to whether or not the pixel values are similar, like the character-color determining module 2930 as described above, and passes pixels, which are judged to be similar (that is, ones which are judged to be pixels constituting a character) to the background-image forming module 3250.

The background-image forming module 3250 is connected to the character-color determining module 3230 and the background-layer processing module 3260. The background-image forming module 3250 erases the pixels, which are passed from the character-color determining module 3230, from the input image. That is, this module 3250 forms a background image which is a multilevel image, and passes it to the background-layer processing module 3260.

<Exemplary Embodiment 3-3>

Although, in the exemplary embodiment 3-2 (including its modification), the mean value of the black pixel positions of the character is used as color information of the character, edges of the character may not match each other depending on the forming of the selection layer. Therefore, it is concerned that the color may change.

Therefore, the exemplary embodiment 3-3 obtains a character color around the center of a character. That is, the character-color determining module 2930 (3230) of the exemplary embodiment 3-3 obtains pixel values of pixels of a corresponding input image in positions around the center of the character and determines the obtained pixel values as a chanter color. For this process, after degenerating a pixel block which is a character, a mean value thereof may be obtained. As a degeneration method, there is a method in which a pixel block is decreased sequentially from 1 by distance conversion. A method for distance conversion is disclosed in pages 96 to 103 of "Image Engineering" (Toshi MINAMI, et al., first edition, published by Corona Publishing Co., Ltd.).

<Modified Example>

The modules in the above-described exemplary embodiments may be combined.

Although the techniques of adding the color information for each character of an outline font have been described in the above-described exemplary embodiments, an equivalent process may be performed by one other than the outline font. That is, the resultant vectorized character may be one other than the outline font. Instead, it may be described using various drawing commands. For example, a closed area of a character image may be described using a command describing a straight line, a command describing a Bezier curve, a command describing a rectangle and so on. If the closed area is painted out (filled), designated color information may be obtained in a manner shown in the above-described exemplary embodiments 1-3-1 to 1-3-3.

Although a color is obtained for each pixel constituting a character in the above-described exemplary embodiments, there is certainly no need of specifying pixels constituting a character.

For example, after extracting a rectangle including a character, an equivalent process may be performed for all the pixels in the rectangle. This method does not specify pixels constituting a character. Therefore, a process thereof becomes simplified.

If, in designating color information of characters by drawing commands, color information which is the same as color information for the previous character is designated, it may not be necessary to designate the color information. Therefore, if the current character has the same color as the previous character, a process of not describing the color may be performed. For this process, a memory for maintaining the color may be added to the above-described exemplary embodiments. If the color is changed, the color is maintained in the memory and a designating command for color information may be output.

If colors having a large color difference therebetween are present in the above-described exemplary embodiments, the character may not be returned to the background image. That is, pixels constituting the character may not be adopted as a character.

In this case, since a character code for the character is not input, a result of character recognition cannot be added.

Thus, in this case, the character-layer processing modules (or modules corresponding thereto) in the respective exemplary embodiments may perform character layer processes including a character code for a transparent color. Alternatively, the character-layer processing modules may perform empty font registration as a character code, and may perform character layer processes.

Although, in the above-described exemplary embodiments, several processing methods in the cases where colors having large color difference therebetween have been described, another processing methods may be performed.

For example, in the case of the exemplary embodiment 3-1, the selection information may be used as the clip information of the foreground image in the same manner as the exemplary embodiment 2.

Figure 33:
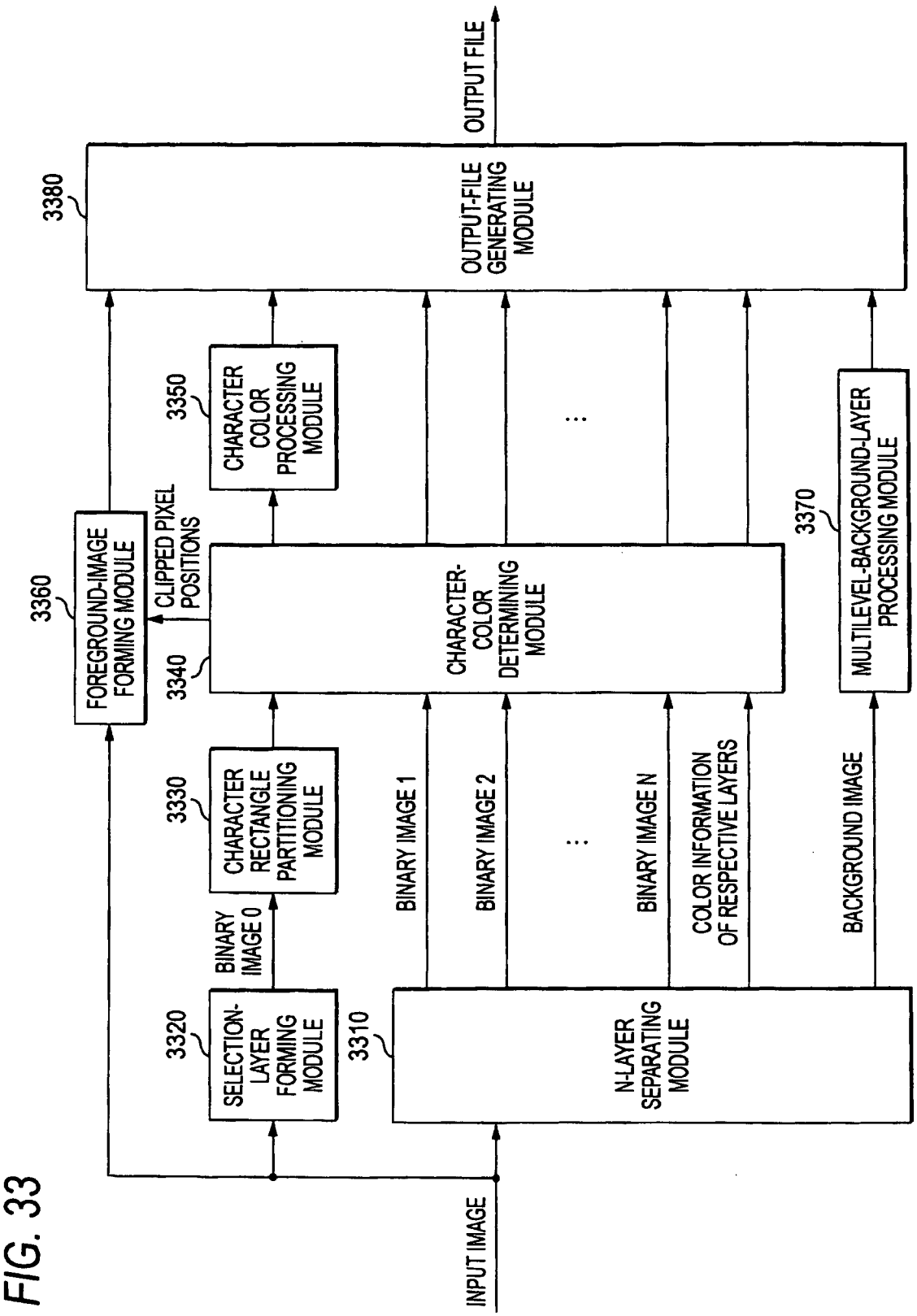
FIG. 33 is a module configuration diagram conceptually showing an exemplary configuration of a modified example of the exemplary embodiment 3-1.

FIG. 33 is a module configuration diagram conceptually showing an exemplary configuration of a modified example of the exemplary embodiment 3-1.

The modified example of the exemplary embodiment 3-1 is configured to include an N-layer separating module 3310, a selection-layer forming module 3320, a character rectangle partitioning module 3330, a character-color determining module 3340, a character-layer processing module 3350, a foreground-image forming module 3360, a multilevel-background-layer processing module 3370 and an output-file generating module 3380. The N-layer separating module 3310 corresponds to the N-layer separating module 2410, the selection-layer forming module 3320 to the selection-layer forming module 2420, the character-color determining module 3340 to the character-color determining module 2440, the multilevel-background-layer processing module 3370 to the multilevel-background-layer processing module 2450, and the output-file generating module 3380 to the output-file generating module 2460.

The character rectangle partitioning module 3330 is connected to the selection-layer forming module 3320 and the character rectangle partitioning module 3340. The character rectangle partitioning module 3330 has the same function as the character rectangle partitioning module 2920 of the exemplary embodiment 3-2.

The character-color determining module 3340 is connected to the N-layer separating module 3310, the character rectangle partitioning module 3330, the character-layer processing module 3350, the foreground-image forming module 3360 and the output-file generating module 3380. The character-color determining module 3340 adds color information to each character rectangle partitioned by the character rectangle partitioning module 3330. Furthermore, this module 3340 passes a binary image, which represents a clipped position, as clip information, to the foreground-image forming module 3360.

If color differences among pixels in a character rectangle are large, the character-color determining module 3340 judges that the pixel positions are to be clipped.

The character-layer processing module 3350 is connected to the character-color determining module 3340 and the output-file generating module 3380. The character-layer processing module 3350 has the same function as the character-layer processing module of the exemplary embodiment 1.

The foreground-image forming module 3360 is connected to the character-color determining module 3340 and the output-file generating module 3380. The foreground-image forming module 3360 receives the binary image representing the clipped positions from the character-color determining module 3340. This module 3360 forms a foreground image using the binary image and the input image. A method for forming the foreground image is the same as that disclosed in JP 2000-196893 A (corresponding to US 2001/0000710 A and US 2001/0000711 A).

The foreground-image forming module 3360 may form the foreground image from the input image using the clip information passed from the character-color determining module 3340, so as to leave the clipped pixel positions. This formation method is the same as a process of forming a foreground image by changing the selection information into the clipped pixel positions as disclosed in JP 2000-196893 A (corresponding to US 2001/0000710 A and US 2001/0000711 A).

Also, the foreground-image forming module 3360 may compress the foreground image.

For example, in the case of the exemplary embodiment 3-2, the selection information may be used as the clip information of the foreground image in the same manner as the exemplary embodiment 2.

Figure 34:
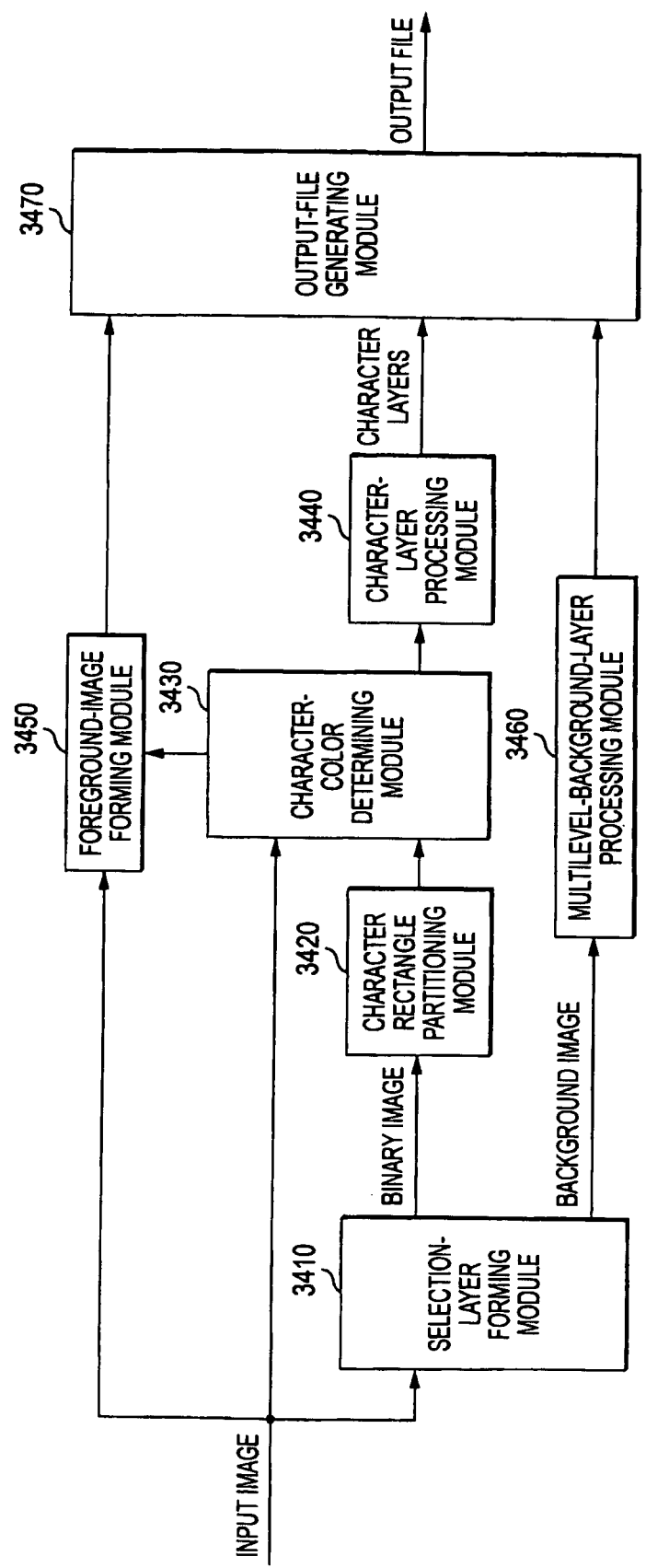
FIG. 34 is a module configuration diagram conceptually showing an exemplary configuration of a modified example 2 of the exemplary embodiment 3-2.

FIG. 34 is a module configuration diagram conceptually showing an exemplary configuration of a modified example 2 of the exemplary embodiment 3-2.

The modified example 2 of the exemplary embodiment 3-2 is configured to include a selection-layer forming module 3410, a character rectangle partitioning module 3420, a character-color determining module 3430, a character-layer processing module 3440, a foreground-image forming module 3450, a multilevel-background-layer processing module 3460 and an output-file generating module 3470. The selection-layer forming module 3410 corresponds to the selection-layer forming module 2910, the character rectangle partitioning module 3420 to the character rectangle partitioning module 2920, the character-color determining module 3430 to the character-color determining module 2930, the character-layer processing module 3440 to the character-layer processing module 2940, the multilevel-background-layer processing module 3460 to the multilevel-background-layer processing module 2950, and the output-file generating module 3470 to the output-file generating module 2960.

The character-color determining module 3430 is connected to the character rectangle partitioning module 3420, the foreground-image forming module 3450 and the character-layer processing module 3440. The character-color determining module 3430 adds color information to each character rectangle partitioned by the character rectangle partitioning module 3420. Furthermore, this module 3430 passes a binary image, which represents clipped positions, as clip information to the foreground-image forming module 3450.

If color differences among pixels in a character rectangular are large, the character-color determining module 3430 judges that the pixel positions are to be clipped.

The foreground-image forming module 3450 is connected to the character-color determining module 3430 and an output-file generating module 3470. The foreground-image forming module 3450 receives the binary image representing the clipped positions from the character-color determining module 3430. This module 3450 forms a foreground image using the binary image and the input image. A method for forming the foreground image is the same as that disclosed in JP 2000-196893 A (corresponding to US 2001/0000710 A and US 2001/0000711 A).

The output-file generating module 3380 of the modified example of the exemplary embodiment 3-1 and the output-file generating module 3470 of the modified example 2 of the exemplary embodiment 3-2 generate an output file (an output file 3500 or an output file 3600).

Figure 35:
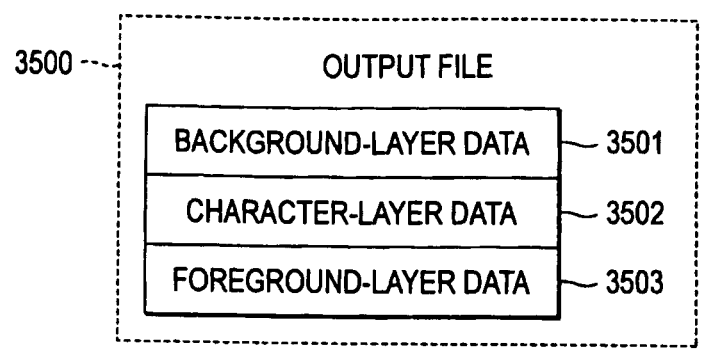
FIG. 35 is an explanatory diagram showing an example of a data structure of an output file.

FIG. 35 is an explanatory diagram showing an example of a data structure of the output file 3500. The output file 3500 has background-layer data 3501, character-layer data 3502 and foreground-layer data 3503.

Figure 36:
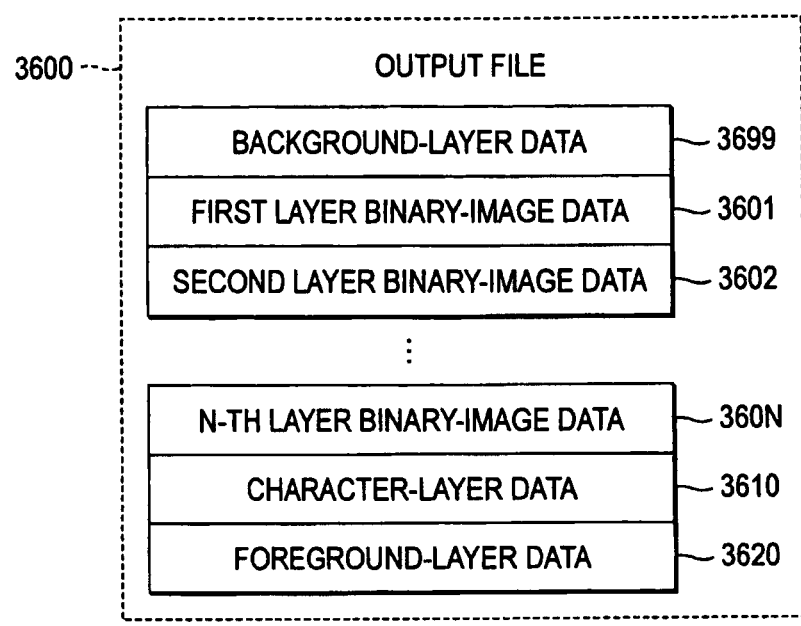
FIG. 36 is an explanatory diagram showing an example of a data structure of an output file.

FIG. 36 is an explanatory diagram showing an example of a data structure of the output file 3600. The output file 3600 has background-layer data 3699, first layer binary-image data 3601, second layer binary-image data 3602, N-th layer binary-image data 360N, character-layer data 3610 and foreground-layer data 3620.

A character-layer-data table 3700 may include character color data and information as to whether or not a character has a character color which is clipped using a foreground image. Specifically, an example of a data structure as shown in FIG. 37 may also be adopted. The character-layer-data table 3700 has a character code column 3701, a character size column 3702, a character position X column 3703, a character position Y column 3704, a character color column 3705, and a column 3706 indicating as to whether or not clipping is performed.

As an output file, character-layer data in case of clipping may be the same as the output file 2300 of the exemplary embodiment 2. That is, the output file 2300 includes the background image data 2301, the foreground image data 2302, the outline data 2303, and the drawing description 2304.

The following information ((1) to (3)) is described in drawing description 2304:
(1) A command to draw background images
(2) A command to clip foreground images using outline data which is the selection information
(3) A command to overwrite the clipped foreground images on the background images The command to draw background images is the same as the case of no clipping. Therefore, no special command is needed even in the case of clipping. If a character (or a closed area described by drawing commands) is clipped, a clip command is described, not color information. Also, foreground images for which the clipping is performed are described.

Figure 38:
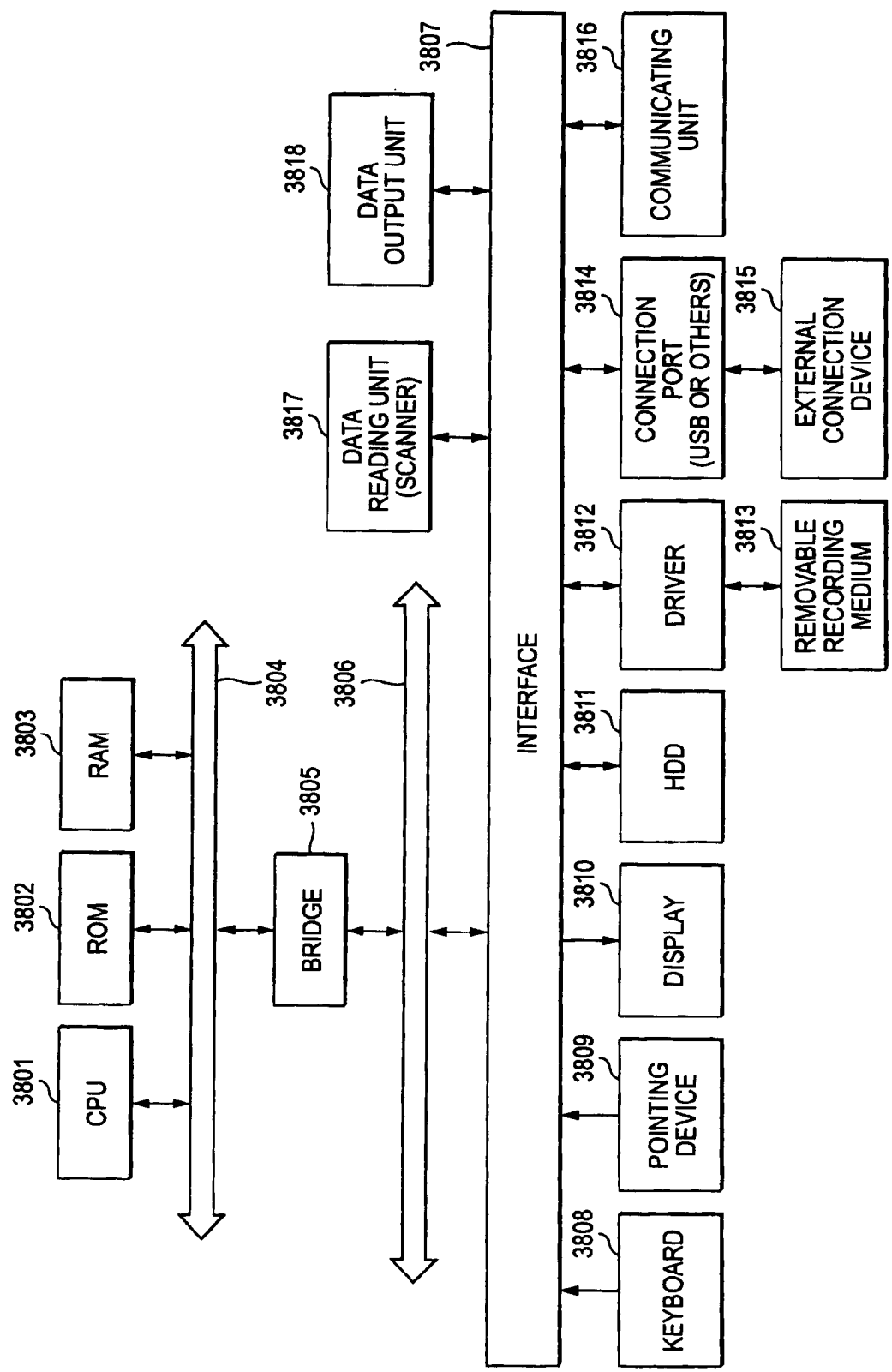
FIG. 38 is a block diagram showing an exemplary hardware configuration of a computer implementing the first to exemplary embodiment 3s.

Now, an example of hardware configuration of the above embodiments will be described with reference to FIG. 38. The hardware shown in FIG. 38 is configured by, for example, a personal computer (PC) or the like, including a data reading unit 3817 such as a scanner, and a data output unit 3818 such as a printer.

CPU (Central Processing Unit) 3801 is a control unit that performs processes according to computer programs which describe execution sequences of various modules described in the above exemplary embodiments, such as the N-layer separating module 110, the character-layer processing module 121, the output file generating module 130, the font registering module 430, the output-file generating module 440, the representative character determining module 620, the enlarging module 840, the unified-font processing module 1440, the three-layer separating module 2210, the selection-layer generating module 2420, the multilevel-background-layer processing module 2450 and so on.

ROM (Read Only Memory) 3802 stores programs and operating parameters used by the CPU 3801. RAM (Random Access Memory) 3803 stores programs used for execution of the CPU 3801, parameters that are suitably varied in the execution, etc. These components are interconnected by a host bus 3806 configured by a CPU bus or the like.

The host bus 3806 is connected to an external bus 3806, such as a PCI (Peripheral Component Interconnect/Interface), via a bridge 3805.

A keyboard 3808 and a pointing device 3809 such as a mouse are input devices that are operated by an operator. A display 3810 such as a liquid crystal display, a cathode ray tube (CRT) or the like displays a variety of information as texts or image information.

HDD (Hard Disk Drive) 3811 contains a hard disk and drives the hard disk to record or reproduce programs executed by the CPU 3801 or other information. The hard disk stores input image data, output files and processing results by the respective modules. Furthermore, various computer programs such as various data processing programs are stored therein.

A driver 3812 reads data or programs recorded on a removable recording medium 3813 such as a magnetic disk, an optical disk, a magneto-optical disk or a semiconductor memory, which is mounted thereon, and supplies the read data or programs to the RAM 3803 connected thereto via an interface 3807, the external bus 3806, the bridge 3805 and the host bus 3806. The removable recording medium 3813 can be also used as the same data recording region as the hard disk.

A connection port 3814 is a port that connects an external connection device 3815 and has a connection unit such as USB, IEEE1394 or the like. The connection port 3814 is connected to the CPU 3801 and so on via the interface 3807, the external bus 3806, the bridge 3805, the host bus 3806 and so on. A communication unit 3816 is connected to a network and processes data communication with the outside. The data reading unit 3817 is, for example, a scanner and performs a read process for documents. The data output unit 3818 is, for example, a printer and performs an output process for document data.

Also, the hardware configuration shown in FIG. 38 is provided as an example, and the above embodiments are not limited to the configuration shown in FIG. 38 but may employ any configurations if only they can execute the modules described in the above embodiments. For example, some modules may be configured by dedicated hardware (for example, Application specific Integrated Circuits (ASICs)), some modules may have a form connected by a communication line in an external system, or systems shown in FIG. 41 are interconnected by a plurality of communication lines to cooperate with each other. Also, the modules may be incorporated in a copy machine, a facsimile, a scanner, a printer, a multi-function apparatus (an image processing apparatus that has any two or more of functions of scanner, printer, copy machine, facsimile, etc.) and so on.

Also, the above-described programs may be stored in a recording medium or may be provided through a communication means. In this case, for example, the above-described programs may be considered as inventions of "computer readable recording medium having programs recorded thereon".

"Computer readable recording medium having programs recorded thereon" refers to a recording medium that has programs recorded thereon and can be read by a computer, which is used for program installation, execution, distribution and so on.

Also, the recording medium includes, for example, "DVD-R, DVD-RW, DVD-RAM and so on" which are digital * versatile disk (DVD) and have standards prescribed by DVD Forum, "DVD+R, DVD+RW and so on" which have standards prescribed by DVD+RW, compact disks (CD) such as read only compact disk (CD-ROM), CD-Recordable (CD-R), CD-ReWritable (CD-RW) and so on, magneto-optical disks (MO), flexible disks (FD), magnetic tapes, hard disks, read only memories (ROM), electrically erasable and programmable read only memories (EEPROM), flash memories, random access memories (RAM), etc.

Also, the above-described programs or some thereof may be recorded on the recording medium for conservation or distribution. Also, the above-described programs or some thereof may be transmitted by means of communication, for example, using transmission media such as wired networks used in local area network (LAN), metropolitan area network (MAN), wide area network (WAN), Internet, intranet, extranet and so on, or wireless communication networks, or combinations thereof, or may be carried on a carrier.

Also, the above programs may be a portion of a different program or may be recorded on the recording medium along with different programs. Also, the above programs may be dividedly recorded on a plurality of recording media. Also, the above programs may be recorded in any forms such as compression and coding as long as they can be restored.

What is claimed is:

1. An image processing apparatus comprising a processor, the processor adapted to function as:
    an image extracting unit that extracts, from a multilevel image, a foreground image for each color as a binary image;
    a vector information generating unit that vectorizes the foreground images in the multilevel image to generate vector information;
    a color determining unit that determines color information of the vector information based on colors of the binary images, which are extracted by the image extracting unit and correspond to the vector information generated by the vector information generating unit;
    a background image encoding unit that encodes a multilevel background image in the multilevel image; and
    a file generating unit that generates a file having (i) the multilevel background image encoded by the background image encoding unit, (ii) the vector information generated by the vector information generating unit and (iii) the color information which correspond to the vector information and are determined by the color determining unit, wherein the vector information generated by the vector information generating unit indicates shapes of outlined characters, and
    the color determining unit changes the determination when any one of the following conditions are met: (i) only one of the binary images corresponds to a single one of the characters, (ii) plural binary images correspond to the single one of the characters and the colors of the plural binary images are similar to each other, and (iii) plural binary images correspond to the single one of the characters and the colors of the plural binary images are not similar.

2. The image processing apparatus according to claim 1, wherein
    when a plurality of binary images correspond to the vector information, the color determining unit determines the color of the vector information based on a mean value of colors of the binary images or areas occupied by the colors.

3. A non-transitory computer-readable medium storing a program that causes a computer to execute image processing, the image processing comprising:
    extracting, from a multilevel image, a foreground image for each color as a binary image;
    vectorizing the foreground images in the multilevel image to generate vector information;
    determining color information of the vector information based on colors of the extracted binary images, which correspond to the generated vector information;
    encoding a multilevel background image in the multilevel image; and
    generating a file having (i) the encoded multilevel background image, (ii) the generated vector information and (iii) the determined color information which correspond to the vector information, wherein
    the vector information indicates shapes of outlined characters, and
    the color determining unit changes the determination when any one of the following conditions are met: (i) only one of the binary images corresponds to a single one of the characters, (ii) plural binary images correspond to the single one of the characters and the colors of the plural binary images are similar to each other, and (iii) plural binary images correspond to the single one of the characters and the colors of the plural binary images are not similar.

* * * * *